US011895483B2

(12) United States Patent
Schmidt et al.

(10) Patent No.: US 11,895,483 B2
(45) Date of Patent: **\*Feb. 6, 2024**

(54) MIXED REALITY SPATIAL AUDIO

(71) Applicant: Magic Leap, Inc., Plantation, FL (US)

(72) Inventors: Brian Lloyd Schmidt, Bellevue, WA (US); Jehangir Tajik, Fort Lauderdale, FL (US); Jean-Marc Jot, Aptos, CA (US)

(73) Assignee: Magic Leap, Inc., Plantation, FL (US)

( * ) Notice: Subject to any disclaimer, the term of this patent is extended or adjusted under 35 U.S.C. 154(b) by 563 days.

This patent is subject to a terminal disclaimer.

(21) Appl. No.: 17/089,593

(22) Filed: Nov. 4, 2020

(65) Prior Publication Data

US 2021/0160647 A1  May 27, 2021

Related U.S. Application Data

(63) Continuation of application No. 16/803,301, filed on Feb. 27, 2020, now Pat. No. 10,863,301, which is a
(Continued)

(51) Int. Cl.
*H04S 7/00* (2006.01)
*G06F 3/01* (2006.01)
(Continued)

(52) U.S. Cl.
CPC ............... *H04S 7/304* (2013.01); *G06F 3/01* (2013.01); *H04S 3/008* (2013.01); *H04S 7/306* (2013.01);
(Continued)

(58) Field of Classification Search
CPC .......... H04S 7/30; H04R 5/033; H04R 27/00; H04R 5/027; H04R 5/04; H04R 29/001;
(Continued)

(56) References Cited

U.S. PATENT DOCUMENTS 4,852,988 A 8/1989 Velez
4,953,219 A 8/1990 Kasal et al.
(Continued)

FOREIGN PATENT DOCUMENTS

CA 2316473 A1 1/2001
CA 2362895 A1 12/2002
(Continued)

OTHER PUBLICATIONS

Chinese Office Action dated Dec. 21, 2022, for CN Application No. 201980012962.X, with English translation, 17 pages.
(Continued)

*Primary Examiner* — Alexander Krzystan
(74) *Attorney, Agent, or Firm* — Morrison & Foerster LLP

(57) ABSTRACT

A method of presenting an audio signal to a user of a mixed reality environment is disclosed. According to examples of the method, an audio event associated with the mixed reality environment is detected. The audio event is associated with a first audio signal. A location of the user with respect to the mixed reality environment is determined. An acoustic region associated with the location of the user is identified. A first acoustic parameter associated with the first acoustic region is determined. A transfer function is determined using the first acoustic parameter. The transfer function is applied to the first audio signal to produce a second audio signal, which is then presented to the user.

20 Claims, 21 Drawing Sheets

Related U.S. Application Data continuation of application No. 16/163,529, filed on Oct. 17, 2018, now Pat. No. 10,616,705.

(60) Provisional application No. 62/631,418, filed on Feb. 15, 2018, provisional application No. 62/573,448, filed on Oct. 17, 2017.

(51) Int. Cl.
*H04S 3/00* (2006.01)
*H04R 5/033* (2006.01)

(52) U.S. Cl.
CPC ............. *H04R 5/033* (2013.01); *H04S 7/301* (2013.01); *H04S 2400/01* (2013.01); *H04S 2400/11* (2013.01); *H04S 2400/15* (2013.01); *H04S 2420/01* (2013.01)

(58) Field of Classification Search
CPC .................. H04R 1/1075; H04R 1/342; H04R 2201/107; H04R 2205/022; H04R 2205/024; H04R 2227/007; H04R 2420/07; H04R 3/005; H04R 5/02; H04R 2201/401; H04R 2227/003; H04R 1/028; H04R 1/1008; H04R 1/1083; H04R 2460/01; H04R 2499/13; H04R 3/02
USPC ....................................... 381/310, 22; 700/94
See application file for complete search history.

(56) References Cited

U.S. PATENT DOCUMENTS

| | | |
|---|---|---|
| 5,491,754 A | 2/1996 | Jot |
| 5,555,306 A | 9/1996 | Gerzon |
| 5,812,674 A | 9/1998 | Jot |
| 6,188,769 B1 | 2/2001 | Jot |
| 6,433,760 B1 | 8/2002 | Vaissie |
| 6,453,047 B1 | 9/2002 | Dicker |
| 6,491,391 B1 | 12/2002 | Blum et al. |
| 6,665,407 B1 | 12/2003 | Dicker |
| 6,798,889 B1 | 9/2004 | Dicker |
| 6,847,336 B1 | 1/2005 | Lemelson |
| 6,917,686 B2 | 7/2005 | Jot |
| 6,943,754 B2 | 9/2005 | Aughey |
| 6,977,776 B2 | 12/2005 | Volkenandt et al. |
| 6,978,027 B1 | 12/2005 | Dahl |
| 7,099,482 B1 | 8/2006 | Jot |
| 7,149,314 B2 | 12/2006 | Dahl |
| 7,231,054 B1 | 6/2007 | Jot |
| 7,257,231 B1 | 8/2007 | Avendano |
| 7,315,624 B2 | 1/2008 | Avendano |
| 7,347,551 B2 | 3/2008 | Fergason et al. |
| 7,412,380 B1 | 8/2008 | Avendano |
| 7,488,294 B2 | 2/2009 | Torch |
| 7,561,699 B2 | 7/2009 | Jot |
| 7,567,845 B1 | 7/2009 | Avendano |
| 7,848,531 B1 | 12/2010 | Vickers |
| 7,928,311 B2 | 4/2011 | Trivi |
| 7,970,144 B1 | 6/2011 | Avendano |
| 8,000,485 B2 | 8/2011 | Walsh |
| 8,019,093 B2 | 9/2011 | Avendano |
| 8,107,631 B2 | 1/2012 | Merimaa |
| 8,235,529 B1 | 8/2012 | Raffle |
| 8,280,077 B2 | 10/2012 | Avendano |
| 8,345,899 B2 | 1/2013 | Merimaa |
| 8,374,365 B2 | 2/2013 | Goodwin |
| 8,379,868 B2 | 2/2013 | Goodwin |
| 8,488,796 B2 | 7/2013 | Jot |
| 8,611,015 B2 | 12/2013 | Wheeler |
| 8,619,998 B2 | 12/2013 | Walsh |
| 8,638,498 B2 | 1/2014 | Bohn et al. |
| 8,696,113 B2 | 4/2014 | Lewis |
| 8,712,061 B2 | 4/2014 | Jot |
| 8,831,255 B2 | 9/2014 | Crawford |
| 8,879,750 B2 | 11/2014 | Walsh |
| 8,908,874 B2 | 12/2014 | Johnston |
| 8,929,589 B2 | 1/2015 | Publicover et al. |
| 9,010,929 B2 | 4/2015 | Lewis |
| 9,014,377 B2 | 4/2015 | Goodwin |
| 9,042,565 B2 | 5/2015 | Jot |
| 9,197,979 B2 | 11/2015 | Lemieux |
| 9,253,574 B2 | 2/2016 | Thompson |
| 9,274,338 B2 | 3/2016 | Robbins et al. |
| 9,292,973 B2 | 3/2016 | Bar-zeev et al. |
| 9,386,373 B2 | 7/2016 | Ma |
| 9,391,579 B2 | 7/2016 | Walsh |
| 9,432,790 B2 | 8/2016 | Raghuvanshi et al. |
| 9,496,850 B2 | 11/2016 | Jot |
| 9,530,421 B2 | 12/2016 | Jot |
| 9,558,757 B1 | 1/2017 | Li |
| 9,591,427 B1 | 3/2017 | Lyren |
| 9,697,844 B2 | 7/2017 | Walsh |
| 9,720,505 B2 | 8/2017 | Gribetz et al. |
| 9,728,181 B2 | 8/2017 | Jot |
| 9,754,597 B2 | 9/2017 | Jot |
| 9,779,731 B1 | 10/2017 | Haskin et al. |
| 9,794,721 B2 | 10/2017 | Goodwin |
| 9,865,245 B2 | 1/2018 | Kamdar |
| 9,906,885 B2 | 2/2018 | Visser et al. |
| 9,924,289 B2 | 3/2018 | Trivi |
| 10,013,053 B2 | 7/2018 | Cederlund et al. |
| 10,025,379 B2 | 7/2018 | Drake et al. |
| 10,038,967 B2 | 7/2018 | Jot |
| 10,063,207 B2 | 8/2018 | Malak |
| 10,531,220 B2 | 1/2020 | Sanger et al. |
| 10,609,502 B2 | 3/2020 | Zhang et al. |
| 10,616,705 B2 | 4/2020 | Schmidt |
| 10,645,520 B1 | 5/2020 | Amengual Gari et al. |
| 10,674,307 B1 | 6/2020 | Robinson et al. |
| 10,685,641 B2 | 6/2020 | Asada et al. |
| 10,735,884 B2 | 8/2020 | Audfray et al. |
| 10,863,301 B2 | 12/2020 | Schmidt |
| 10,880,668 B1 | 12/2020 | Robinson et al. |
| 10,952,010 B2 | 3/2021 | Audfray et al. |
| 11,184,727 B2 | 11/2021 | Jeon et al. |
| 11,304,017 B2 | 4/2022 | Parvaix et al. |
| 11,477,510 B2 | 10/2022 | Tajik et al. |
| 11,540,072 B2 | 12/2022 | Parvaix et al. |
| 2003/0030597 A1 | 2/2003 | Geist |
| 2003/0159569 A1 | 8/2003 | Ohta |
| 2006/0023158 A1 | 2/2006 | Howell et al. |
| 2007/0160241 A1 | 7/2007 | Joublin |
| 2007/0173730 A1 | 7/2007 | Bikko |
| 2009/0220100 A1 | 9/2009 | Ohta et al. |
| 2011/0211056 A1 | 9/2011 | Publicover et al. |
| 2011/0213664 A1 | 9/2011 | Osterhout |
| 2011/0235813 A1 | 9/2011 | Gauger, Jr. |
| 2011/0251704 A1 | 10/2011 | Walsh |
| 2012/0021806 A1 | 1/2012 | Maltz |
| 2012/0093320 A1 | 4/2012 | Flaks |
| 2013/0041648 A1 | 2/2013 | Osman |
| 2013/0236040 A1 | 9/2013 | Crawford |
| 2014/0153727 A1 | 6/2014 | Walsh et al. |
| 2014/0195918 A1 | 7/2014 | Friedlander |
| 2014/0270184 A1 | 9/2014 | Beaton |
| 2014/0282663 A1 | 9/2014 | Lee |
| 2014/0320389 A1 | 10/2014 | Scavezze |
| 2015/0168731 A1 | 6/2015 | Robbins |
| 2015/0302652 A1 | 10/2015 | Miller |
| 2015/0380010 A1 | 12/2015 | Srinivasan |
| 2016/0027216 A1* | 1/2016 | da Veiga ............... G06F 3/013 345/158 |
| 2016/0027218 A1* | 1/2016 | Salter ............... G02B 27/0093 345/633 |
| 2016/0057522 A1 | 2/2016 | Choisel et al. |
| 2016/0088417 A1 | 3/2016 | Kim |
| 2016/0212272 A1 | 7/2016 | Srinivasan |
| 2016/0212538 A1 | 7/2016 | Fullam et al. |
| 2016/0360332 A1* | 12/2016 | Shin .................... H04M 1/60 |
| 2017/0041445 A1 | 2/2017 | Ukai et al. |
| 2017/0080229 A1 | 3/2017 | Meister |
| 2017/0126194 A1 | 5/2017 | Jot |
| 2017/0127212 A1 | 5/2017 | Jot |

(56) References Cited

U.S. PATENT DOCUMENTS

| | | |
|---|---|---|
| 2017/0208415 A1 | 7/2017 | Ojala |
| 2017/0208416 A1 | 7/2017 | Petrov |
| 2017/0223478 A1 | 8/2017 | Jot |
| 2017/0230760 A1 | 8/2017 | Sanger et al. |
| 2017/0238119 A1 | 8/2017 | Schlecht et al. |
| 2017/0325043 A1 | 11/2017 | Jot |
| 2018/0045963 A1 | 2/2018 | Hoover et al. |
| 2018/0206046 A1 | 7/2018 | Rosenkranz et al. |
| 2018/0359582 A1 | 12/2018 | Belhomme et al. |
| 2019/0387352 A1 | 12/2019 | Jot et al. |
| 2020/0320768 A1* | 10/2020 | Salemme ............ A61B 5/7475 |
| 2020/0381007 A1 | 12/2020 | Hur et al. |
| 2020/0382895 A1 | 12/2020 | Schissler |
| 2021/0084357 A1 | 3/2021 | Tajik et al. |
| 2021/0110809 A1 | 4/2021 | Lastrucci |
| 2021/0127220 A1 | 4/2021 | Parvaix et al. |
| 2022/0272469 A1 | 8/2022 | Parvaix et al. |
| 2023/0007332 A1 | 1/2023 | Tajik et al. |
| 2023/0077524 A1 | 3/2023 | Parvaix et al. |

FOREIGN PATENT DOCUMENTS

| | | | |
|---|---|---|---|
| CA | 2388766 A1 | | 12/2003 |
| GB | 2536020 A | | 9/2016 |
| JP | S5264974 A | | 5/1977 |
| JP | 2014505420 A | | 2/2014 |
| KR | 1020160005695 | | 1/2016 |
| WO | 2012093352 A1 | | 7/2012 |
| WO | 2018026828 A1 | | 2/2018 |
| WO | 2019079523 A1 | | 4/2019 |

OTHER PUBLICATIONS

European Office Action dated Dec. 8, 2022, for EP Application No. 18867954.2, eight pages.
European Search Report dated Nov. 24, 2022, for EP Application No. 20880077.1, nine pages.
Chinese Office Action dated Feb. 15, 2022, for CN Application No. 201880067405.3, with English translation, 4 pages.
Australian Office Action dated Oct. 4, 2022, for AU Application No. 2018353008, three pages.
Japanese Office Action dated Oct. 4, 2022, for JP Application No. 2020-521454, with English translation, 9 pages.
Korean Office Action dated Oct. 31, 2022, for KR Application No. 10-2020-7013593, with English translation, 14 pages.
Chinese Office Action dated Apr. 20, 2022, for CN Application No. 201980012962.X, with English translation, 13 pages.
Indian Office Action dated Apr. 22, 2022, for IN Application No. 202047020450, with English translation, 7 pages.
International Preliminary Report on Patentability and Written Opinion, dated May 5, 2022, for PCT Application No. PCT/US2020/057203, filed Oct. 23, 2020, six pages.
Audfray, R. et al. (2018). "Practical Realization of Dual-Shelving Filter Using Proportional Parametric Equalizers," Audio Eng. Society 145th Convention, Paper 10054, Oct. 17-20, 2018, New York, NY, seven pages.
Audfray, R. et al. (2019). "Headphone Technology," 2019 AES International Conference, Aug. 27-29, 2019, San Francisco, CA, Powerpoint presentation, 28 slides.
Avendano, C. (Jun. 2002). "Frequency Domain Techniques for Stereo to Multichannel Upmix," Audio Eng. Society, 22nd International Conf. for Virtual, Synthetic, and Entertainment Audio, 10 pages.
Avendano, C. et al. (Apr. 2002). "Ambience Extraction and Synthesis from Stereo Signals for Multi-channel Audio Up-mix," IEEE ICASSP (International Conf. Acoustics, Speech and Signal Processing), pp. II-1957-II-1960.
Avendano, C. et al. (Jul./Aug. 2004). "A Frequency-Domain Approach to Multichannel Upmix," Journal of the Audio Engineering Society 52:7/8, 12 pages.

Chinese Office Action dated May 25, 2021, for CN Application No. 201980012962.X, with English translation, 16 pages.
Dahl, L. et al. (Dec. 2000). "A Reverberator Based on Absorbent All-Pass Filters," Proceedings of the COST G-6 Conference on Digital Audio Effects (DAFX-00), Verona, Italy, Dec. 7-9, 2000, six pages.
European Search Report dated Mar. 10, 2021, for EP Application No. 19754505.6, eleven pages.
European Search Report dated Nov. 10, 20, for EP Application No. 18867954.2, twelve pages.
Final Office Action dated Oct. 6, 2021, for U.S. Appl. No. 16/970,331, filed Aug. 14, 2020, nine pages.
Funkhouser, T. et al. (2003). "Survey of Methods for Modeling Sound Propagation in Interactive Virtual Environment Systems," Presence 53 pages.
Funkhouser, T. et al. (Jul. 2002). "Sounds Good to Me! Computational Sound for Graphics, VR, and Interactive Systems," SIGGRAPH Course Notes, 43 pages.
Goodwin, M. M. et al. (Mar. 2007). "Multichannel Surround Format Conversion and Generalized Upmix," 30th International Conf. Audio Engineering Society, Saarislka, Finland, Mar. 15-17, 2007, nine pages.
Goodwin, M. M. et al. (May 2006). "A Frequency-domain Framework for Spatial Audio Coding Based on Universal Spatial Cues," Convention Paper 6751, Audio Engineering Society, 120th Conv., Paris, France, May 20-23, 2006, 12 pages.
Goodwin, M. M. et al. (Oct. 2006). "Analysis and Synthesis for Universal Spatial Audio Coding," Convention Paper 6874, Audio Engineering Sciety, 121st Conv., San Francisco, California, Oct. 5-8, 2006, 11 pages.
Goodwin, M. M. et al. (Oct. 2007). "Binaural 3-D Audio Rendering Based on Spatial Audio Scene Coding," Convention Paper 7277, Audio Engineering Society, 123rd Conv., New York, New York, Oct. 5-8, 2007, 12 pages.
Goodwin, M.M. et al. (Apr. 2007). "Primary-Ambient Signal Decomposition and Vector-Based Localization for Spatial Audio Coding and Enhancement," Proc. IEEE ICASSP (2007 International Conf. on Acoustics, Speech and Signal Processing), pp. I-9-I-12.
Goodwin, M.M. et al. (Oct. 2008). "Spatial Audio Scene Coding," Convention Paper 7507, Audio Engineering Society, 125th Convention, San Francisco, California, Oct. 2-5, 2008, eight pages.
Harma, A. et al. (Jun. 2004). "Augmented Reality Audio for Mobile and Wearable Appliances," J. Audio Eng. Soc., vol. 52, No. 6, retrieved on Aug. 20, 2019, Retrieved from the Internet: URL:https://pdfs.semanticscholar.org/ae54/82c6a8d4add3e9707d780dfb5ce03d8e0120.pdf , 22 pages.
International Preliminary Report on Patentability dated Aug. 18, 2020, for PCT Application No. PCT/US2019/18368, filed Feb. 15, 2019, five pages.
International Preliminary Report on Patentability dated Apr. 30, 2020, for PCT Application No. PCT/US2018/056385, eleven pages.
International Search Report and Written Opinion, dated Jan. 26, 2021, for PCT Application No. PCT/US2020/057203, filed Oct. 23, 2020, eleven pages.
International Search Report and Written Opinion, dated May 8, 2019, for PCT Application No. PCT/US2019/18368, filed Feb. 15, 2019, eleven pages.
International Search Report dated Jan. 3, 2019, for PCT Patent Application No. PCT/US2018/056385, filed Oct. 17, 2018, three pages.
Johnston, J.D. et al. (Nov. 2010). "Beyond Coding—Reproduction of Direct and Diffuse Sounds in Multiple Environments," Convention Paper 8314, 129th Conv. Audio Eng. Soc., San Francisco, California, Nov. 4-7, 2010, nine pages.
Jost, A. et al. (Dec. 2000). "Transaural 3-D Audio With User-Controlle Calibration," Proceedings of the COST G-6 Conference on Digital Audio Effects (DAFX-00), Verona, Italy, Dec. 7-9, 2000, six pages.
Jot, J-M. (Oct. 2012). "Object-Based Audio Content Authoring and Distribution for Interactive and Linear Soundtracks," 133rd Conv. Audio Engineering Society, 12 pages.

(56) References Cited

OTHER PUBLICATIONS

Jot, J-M. et al. (May 2003). "Spatial Enhancement of Audio Recordings," AES 23rd International Conference, Copenhagen, Denmark, May 23-25, 2003, 2003, 11 pages.

Jot, J-M. et al. (Oct. 2007). "Spatial Audio Scene Coding in a Universal Two-Channel 3-D Stereo Format," Convention Paper 7276, Audio Engineering Society, 123rd Conv., New York, New York, Oct. 5-8, 2007, 15 pages.

Jot, J-M. (2000). "Proposal for 1A-SIG 3D Audio Rendering Guideline Level 3 (13DL3)," IA-SIG 3D Audio Workgroup Meeting, Powerpoint presentation, 13 pages.

Jot, J-M. (Apr. 2012). "Enhancing the 3D TV Experience through Next-Generation 3D Audio Coding and Processing Technology," NAB Broadcast Engineering Conf. listing of presentations only, one page.

Jot, J-M. (Apr. 2017). "New Immersive and Object-Based Multichannel Audio Formats for Cinema, Entertainment and Cinematic VR," IEEE SPS Chapter Talk.

Jot, J-M. (Apr. 7, 2014). "Object-Based Immersive Audio for Next-Generation Boradcast," NAB Broadcast Engineering Conf., 26 pages.

Jot, J-M. (Aug. 2018). "Unleashing Wearable 3D Audio," Audio Eng. Soc. Conference on Audio for Virtual and Augmented Reality, 37 pages.

Jot, J-M. (Dec. 2000). "Efficient Models for Interactive Environmental Audio Spatialization," DAFx International Conf. Digital Audio Effects, 22 pages.

Jot, J-M. (Dec. 2012). "Interactive 3D Audio Rendering in Flexible Playback Configurations," IEEE APSIPA Conf., nine pages.

Jot, J-M. (Feb. 2000). "Advanced Audio BIFS: Environmental Spatialization of Audio in MPEG-4, version 2," Audio Engineering Society, 108th Conv., Presentation, 17 pages.

Jot, J-M. (Feb. 2011). "Next-Generation 3-D Audio—Creation, Transmission and Reproduction," ATSC Symposium on Next Generation Broadcast Television, 20 pages.

Jot, J-M. (Feb. 2016). "Environmental Audio Effects in Games, VR and AR," Audio Eng. Soc., 61st Conf.—Audio for Games, Paragraph located on p. 7, and located at http://www.aes.org/conferences/61/schedule.cfm, last visited on Oct. 23, 2018, 10 pages.

Jot, J-M. (Feb. 2017). "Augmented Reality Headphone Reverberation," DSP Seminar at CCRMA, Stanford Univ, Palo Alto, CA., Abstract Only, one page.

Jot, J-M. (Jan. 1999) "Real-Time Spatial Processing of Sounds for Music, Multimedia and Interaction Human-Computer Interfaces," ACM Multimedia Systems, 7:55-69.

Jot, J-M. (Jan. 2008). "Prospects in Format-Agnostic Spatial Audio," 2nd International SpACE-Net Spatial Audio Workshop, list of presentations, 4 pages.

Jot, J-M. (Jun. 2018). "Towards 6-DoF XR Audio," Immersive Experience IX Symposium, 11 pages.

Jot, J-M. (Jun. 27, 2014). "Next-Generation Immersive Audio Content Standard and Consumer Format," IEEE International Symposium on Broadband Multimedia Systems and Broadcasting, 24 pages.

Jot, J-M. (Mar. 1992) "An Analysis/Synthesis Approach to Real-Time Artificial Reverberations," IEEE ICASSP International Conference on Acoustics, Speech and Signal Processing, San Francisco, CA, Mar. 23-26, 1992, pp. II-221-II-224.

Jot, J-M. (Mar. 2015). "DTS:X Next-Generation Consumer Audio Delivery Solution," AES 57th Conf. on the Future of Audio Entertainment Technology, 16 pages.

Jot, J-M. (Mar. 2015). "Integrating Object-, Scene-, and Channel-Based Immersive Audio for Delivery to the Home," AES 57th Conf. on the Future of Audio Entertainment Technology, presentation Workshop 2 p.m.., p. 5, 5 pages.

Jot, J-M. (May 2001). "Perceptual and Statistical Models for Virtual Environments." ACM Campfire: Acoustic Rendering for Virtual Environments, Preconference Proceedings, Snowbird, Utah, May 26-29, 2001, 10 pages.

Jot, J-M. (Nov. 18, 2013). "MDA—an Open Content Format for Next-Generation Immersive Audio," Forum International du Son Multicanal, 29 pages.

Jot, J-M. (Nov. 2012). "Multichannel 3D Audio Encoding and Reproduction," Forum International du Son Multicanal, 21 pages.

Jot, J-M. (Oct. 2007). "Efficient Description and Rendering of Complex Interactive Acoustic Scenes," Proc. of the 10th Int. Conference on Digital Audio Effects (DAFx-07), Bordeaux, France, Sep. 10-15, 2007, two pages.

Jot, J-M. (Oct. 2008). "Two-Channel Matrix Surround Encoding for Flexible Interactive 3-D Audio Reproduction," Convention Paper 7552, Audio Engineering Society, 125th Conv. San Francisco, California, Oct. 2-5, 2008, 13 pages.

Jot, J-M. (Oct. 2015). "Immersive Audio Processing and Effects for Games," 139th Conv. Audio Engineering Society, 25 pages.

Jot, J-M. (Oct. 2017). "Room-Adaptive Headphone 3D Audio," Audio Engineering Society, 143rd Conv.New York, New York, 23 pages.

Jot, J-M. (Oct. 9, 2013). "Object-Based Immersive Audio Content Format for Next-Generation Broadcast," IEEE Broadcast Symposium, 18 pages.

Jot, J-M. (Sep. 1997). "Efficient Models for Reverberation and Distance Rendering in Computer Music and Virtual Audio Reality," ICMC International Computer Music Conf., eight pages.

Jot, J-M. (Sep. 2017). "Efficient Reverberation Rendering for Complex Interactive Audio Scenes," DAFx 20th International Conf. Digital Audio Effects, 58 pages.

Jot, J-M. et al. (1995). "Le Spatialisateur," GRAME Conf. "Le Son et L'Espace." French only, seven pages.

Jot, J-M. et al. (2006). "Spatialisateur—Introduction," IRCAM (1995, revised 2006.).

Jot, J-M. et al. (2012). "Spatialisateur—Introduction," IRCAM (1995, revised 2012.) Located at http://web4.ircam.fr/ transmission.html?event=1021&L=1 . . . , last visited Oct. 23, 2018, two pages.

Jot, J-M. et al. (Feb. 1991). "Digital Delay Networks for Designing Artificial Reverberators," Audio Engineering Society, 90th Conv., Paris, France, Feb. 19-22, 1991, 17 pages.

Jot, J-M. et al. (Feb. 1995). "Digital Signal Processing Issues in the Context of Binaural and Transaural Stereophony," Audio Engineering Society, 98th Conv., Paris, France, Feb. 25-28, 1995, 47 pages.

Jot, J-M. et al. (Jun. 2016). "MDA—Open Standard for Immersive Audio Content Creation and Distribution," Immersive Experience IX Symposium, 33 pages.

Jot, J-M. et al. (Mar. 1999). "A Comparative Study of 3-D Audio Encoding and Rendering Techniques," Audio Eng. Society, 16th International Conf., 20 pages.

Jot, J-M. et al. (May 1995). "Spat~: a Spatial Processor for Musicians and Sound Engineers," CIARM'95 Conference, Ferrara (Italy) 1995, six pages.

Jot, J-M. et al. (May 2006). "Scene Description Model and Rendering Engine for Interative Virtual Acoustics," Convention Paper 6660, Audio Engineering Society, 120th Conv., Paris, Francs, May 20-23, 2006, 13 pages.

Jot, J-M. et al. (May 2010). "Center-Channel Processing in Virtual 3-D," Convention Paper 8116, Audio Engineering Society, 128th Conv., London, UK, May 22-25, 2010, 10 pages.

Jot, J-M. et al. (Oct. 1993). "Biaural Concert Hall Simulation in Real Time," IEEE Workshop on Applications of Digital Signal Processing to Audio and Acoustics. Located at: http://architexte.ircam.fr/textes/Jot93a/index.html, last visited Oct. 15, 2018, 17 pages.

Jot, J-M. et al. (Oct. 2006). "Binaural Simulation of Complex Acoustic Scenes for Interactive Audio," Convention Paper 6950, Audio Engineering Society, 121st Conv., San Francisco, California, Oct. 5-8, 2006, 20 pages.

Jot, J-M. et al. (Oct. 2011). "Beyond Surround Sound-Creation, Coding and Reproduction of 3-D Audio Soundtracks," Convention Paper 8463, Audio Engineering Society, 131st. Conv., New York, New York, Oct. 20-23, 2011, 11 pages.

Jot, J-M. et al. (Oct. 2015). "Dialog Control and Enhancement in Object-Based Audio Systems," Convention Paper 9356, Audio Engineering Society, 139th Conv., New York, New York, Oct. 29-Nov. 1, 2015, seven pages.

(56) References Cited

OTHER PUBLICATIONS

Jot, J-M. et al. (Oct. 2016). "Augmented Reality Headphone Environment Rendering," Audio Eng. Soc. Conf. on Audio for Virtual and Augmented Reality, Los Angeles, California, Sep. 30-Oct. 1, 2016, six pages.

Jot, J-M. et al. (Oct. 2017). "Efficient Structures for Virtual Immersive Audio Processing," Convention paper 9865, Audio Engineering Society, 143rd Conv. Presented in New York, New York, Oct. 18-21, 2017, eight pages.

Jot, J-M. et al. (Sep. 1997). "Analysis and Synthesis of Room Reverberation Based on a Statistical Time-Frequency Model," Audio Engineering Society, 103rd Convention, 31 pages.

Jot, J-M. et al. (Sep. 1998). "Approaches to Binaural Synthesis," Audio Engineering Society, 105th Conv., San Francisco, California, Sep. 26-29, 1998, 14 pages.

Jot, J-M. et al. (Sep. 20, 1999). "Interactive 3-D Audio Rendering Guidelines Level 2.0," Interactive Audio Special Interest Group, 29 pages.

Larcher, V. et al. (Feb. 2000). "Study and Comparison of Efficient Methods for 3D Audio Spatialization Based on Linear Decomposition of HRTF Data," Audio Engineering Society, 108th Conv., Paris, France, Feb. 19-22, 2000; 30 pages.

Larcher, V. et al. (Sep. 1998). "Equalization Methods in Binaural Technology," Audio Engineering Society, 105th Conv. San Francisco, California, Sep. 26-29, 1998, 29 pages.

Larcher, V. et al. (Sep. 2001). "Individualization of HRTF by Spectral Warping," International Congress on Acoustics, 3 pages.

Laroche, J. et al. (Apr. 1992). "Analysis/Synthese of Quasi-Harmonic Sounds by Use of the Karplus-Strong Algorithm," 2nd French Congress on Acoustics, Journal de Physique IV, Colloque C1, Supplement au Journal de Physique III, 2:C1-117-C1-120 (five pages.).

Marin, M. et al. (May 1994). "Environment de Simulation pour l'Evaluation Psychoacoustique des Systemes de Prise et de Restitution du Son dans un Contexte de Teleconference," 3rd French Congress on Acoustics, five pages.

Merimaa, J. et al. (Oct. 2007). "Correlation-Based Ambience Extraction from Stereo Recordings," Convention Paper 7282. Audio Eng. Society, 123rd Conv., New York, New York, Oct. 5-8, 2007, 15 pages.

Murgai, P. et al. (Oct. 2017). "Blind Estimation of the Reverberation Fingerprint of Unknown Acoustic Environments," Convention Paper 9905, Audio Engineering Society, 143rd Conv. New York, New York, Oct. 18-21, 2017, six pages.

Non-Final Office Action dated Apr. 2, 2020, for U.S. Appl. No. 16/803,301, filed Feb. 27, 2020, seven pages.

Non-Final Office Action dated Aug. 7, 2019, for U.S. Appl. No. 16/163,529, filed Oct. 17, 2018, 12 pages.

Non-Final Office Action dated Jun. 14, 2021, for U.S. Appl. No. 16/970,331, filed Aug. 14, 2020, nine pages.

Notice of Allowance dated May 4, 2020, for U.S. Appl. No. 16/803,301, filed Feb. 27, 2020, five pages.

Notice of Allowance dated Nov. 27, 2019, for U.S. Appl. No. 16/163,529, filed Oct. 17, 2018, 9 pages.

Pernaux, J-M. et al. (Nov. 1998). "Virtual Sound Source Positioning and Mixing in 5.1 Implementation on the Real-Time System Genesis," DAFx International Conf. Digital Audio Effects, five pages.

Ravish, Mehra et al: "WAVE: Interactive Wave-based Sound Propagation for Virtual Environments," IEEE Transactions on Visualization and Computer Graphics, IEEE Service Center, Los Alamitos, CA, US, vol. 21, No. 4, Apr. 18, 2015 (Apr. 18, 2015), pp. 434-442, retrieved on Mar. 20, 2015.

Savioja, L. et al: "Creating interactive virtual acoustic environments," Journal of the audio engineering society, audio engineering society, New York, NY, US, vol. 47, No. 9, Sep. 1, 1999 (Sep. 1, 1999), pp. 675-705, XP000927390, ISSN: 1549-4950, Chapters 2, 4; p. 691-p. 692; figure 19.

Thompson, J. et al. (Oct. 2012). "Direct-Diffuse Decomposition of Multichannel Signals Using a System of Pairwise Correlations," Convention Paper 8807, Audio Engineering Society, 133rd Conv. San Francisco, California, Oct. 26-29, 2012, 15 pages.

Trivi, J-M. et al. (Aug. 2002). "Rendering MPEG-4 AABIFS Content Through a Low-Level Cross-Platform 3D Audio API," IEEE ICME International Conf. Multimedia & Expo., pp. 513-516.

Walker, Robert : "A Simple Acoustic Room Model for Virtual Production," Internet Citation, Jun. 7, 1999 (Jun. 7, 1999), pp. 48-72, Retrieved from the Internet: URL:http://www.aes.org/tmpFiles/elib/20100211/7978.pdf, on Feb. 11, 2010, 30 pages.

Walsh, M. et al. (May 2011). "Adaptive Dynamics Enhancement," Convention Paper 8343, Audio Engineering Society, 130th Conv., London, UK May 13-16, 2011, 10 pages.

Walsh, M. et al. (Oct. 2006). "Loudspeaker-Based 3-D Audio System Design Using the M-S Shuffler Matrix," Convention Paper 6949, Audio Engineering Society, 121st. Conv., San Francisco, California, Oct. 5-8, 2006, 17 pages.

Israeli Notice of Allowance dated Jul. 13, 2022, for IL Application No. 273755, three pages.

Notice of Allowance dated Aug. 10, 2022, for U.S. Appl. No. 16/970,331, filed Aug. 14, 2020, eight pages.

Jacob, R. "Eye Tracking in Advanced Interface Design", Virtual Environments and Advanced Interface Design, Oxford University Press, Inc. (Jun. 1995).

Notice of Allowance dated Oct. 19, 2022, for U.S. Appl. No. 17/686,025, filed Mar. 3, 2020, eight pages.

Rolland, J. et al., "High-resolution inset head-mounted display", Optical Society of America, vol. 37, No. 19, Applied Optics, (Jul. 1, 1998).

Tanriverdi, V. et al. (Apr. 2000). "Interacting With Eye Movements in Virtual Environments," Department of Electrical Engineering and Computer Science, Tufts University, Medford, MA 02155, USA, Proceedings of the SIGCHI conference on Human Factors in Computing Systems, eight pages.

Yoshida, A. et al., "Design and Applications of a High Resolution Insert Head Mounted Display", (Jun. 1994).

Chinese Office Action dated Jan. 24, 2022, for CN Application No. 201980012962.X, with English translation, 16 pages.

Ex Parte Quayle Office Action dated Nov. 8, 2021, for U.S. Appl. No. 17/079,212, filed Oct. 23, 2020, 12 pages.

Non-Final Office Action dated Feb. 16, 2022, for U.S. Appl. No. 16/970,331, filed Aug. 14, 2020, eleven pages.

Notice of Allowance dated Feb. 7, 2022, for U.S. Appl. No. 17/079,212, filed Oct. 23, 2020, five pages.

Japanese Final Office Action dated Jan. 11, 2023, for JP Application No. 2020-521454, with English translation, 8 pages.

Japanese Office Action dated Jan. 10, 2023, for JP Application No. 2020-543327, with English translation, 11 pages.

Chinese Notice of Allowance dated May 7, 2022, for CN Application No. 201880067405.3, with English translation, 4 pages.

Israeli Office Action dated Feb. 14, 2023, for IL Application No. 276510, four pages.

Non-Final Office Action dated Mar. 8, 2023, for U.S. Appl. No. 18/058,232, filed Nov. 22, 2022, six pages.

Chinese Office Action dated Sep. 18, 2021, for CN Application No. 201880067405.3, with English translation, 12 pages.

Australian Notice of Acceptance dated Apr. 6, 2023, for AU Application No. 2018353008, three pages.

European Office Action dated Mar. 20, 2023, for EP Application No. 19754505.6, eight pages.

Israeli Notice of Acceptance dated Jun. 18, 2023, for IL Application No. 276510, four pages.

Korean Office Action dated May 18, 2023, for KR Application No. 10-2020-7013593, with English translation, 5 pages.

Non-Final Office Action dated Apr. 27, 2023, for U.S. Appl. No. 17/943,057, filed Sep. 12, 2022, five pages.

Notice of Allowance dated Jul. 27, 2023, for U.S. Appl. No. 18/058,232, filed Nov. 22, 2022, eight pages.

Israeli Notice of Allowance dated Jun. 29, 2023, for IL Application No. 297445 four pages.

Japanese Final Office Action dated Jul. 10, 2023, for JP Application No. 2020-543327, with English translation, 14 pages.

(56) References Cited

OTHER PUBLICATIONS

Japanese Office Action dated Sep. 26, 2023, for JP Application No. 2020-521454, with English translation, 16 pages.

* cited by examiner

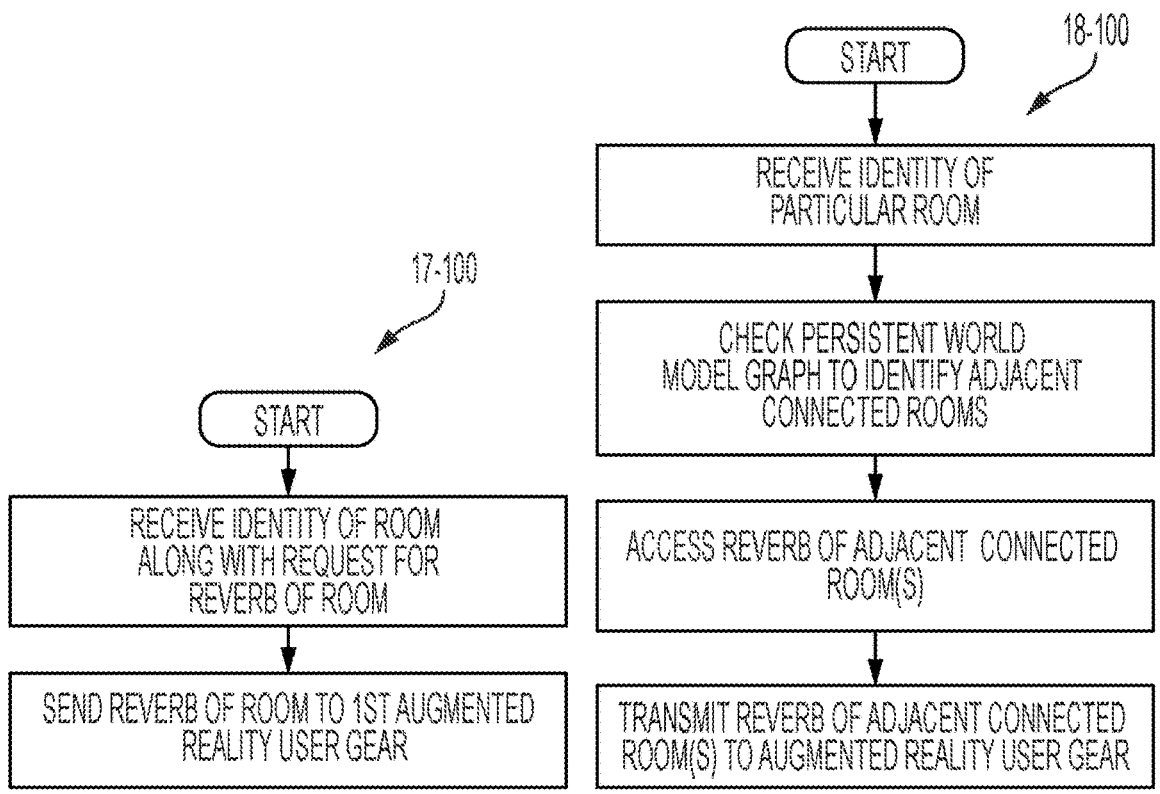
FIG. 17
FIG. 18
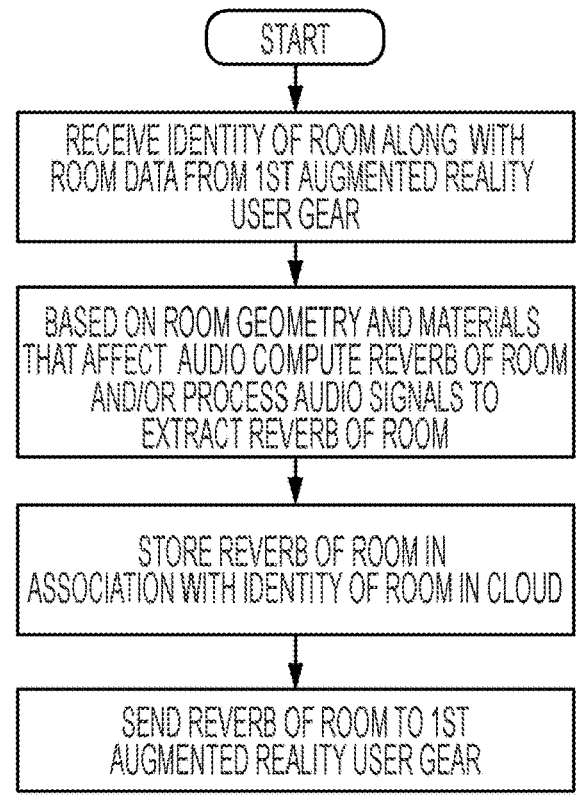
FIG. 19

MIXED REALITY SPATIAL AUDIO

CROSS REFERENCE TO RELATED APPLICATION

This application is a continuation of U.S. application Ser. No. 16/803,301, filed on Feb. 27, 2020 which is a continuation of U.S. application Ser. No. 16/163,529, filed on Oct. 17, 2018, now U.S. Pat. No. 10,616,705, which claims the benefit under 35 U.S.C. § 119(e) of U.S. Provisional Patent Application No. 62/631,418, filed Feb. 15, 2018, and U.S. Provisional Patent Application No. 62/573,448, filed Oct. 17, 2017, the contents of which are incorporated herein by reference in their entireties for all purposes.

FIELD

This disclosure relates in general to systems and methods for presenting audio signals, and in particular to systems and methods for presenting audio signals to a user of a mixed reality environment.

BACKGROUND

Virtual environments are ubiquitous in computing environments, finding use in video games (in which a virtual environment may represent a game world); maps (in which a virtual environment may represent terrain to be navigated); simulations (in which a virtual environment may simulate a real environment); digital storytelling (in which virtual characters may interact with each other in a virtual environment); and many other applications. Modern computer users are generally comfortable perceiving, and interacting with, virtual environments. However, users' experiences with virtual environments can be limited by the technology for presenting virtual environments. For example, conventional displays (e.g., 2D display screens) and audio systems (e.g., fixed speakers) may be unable to realize a virtual environment in ways that create a compelling, realistic, and immersive experience.

Virtual reality ("VR"), augmented reality ("AR"), mixed reality ("MR"), and related technologies (collectively, "XR") share an ability to present, to a user of an XR system, sensory information corresponding to a virtual environment represented by data in a computer system. Such systems can offer a uniquely heightened sense of immersion and realism by combining virtual visual and audio cues with real sights and sounds. Accordingly, it can be desirable to present digital sounds to a user of an XR system in such a way that the sounds seem to be occurring—naturally, and consistently with the user's expectations of the sound—in the user's real environment. Generally speaking, users expect that virtual sounds will take on the acoustic properties of the real environment in which they are heard. For instance, a user of an XR system in a large concert hall will expect the virtual sounds of the XR system to have large, cavernous sonic qualities; conversely, a user in a small apartment will expect the sounds to be more dampened, close, and immediate.

Existing technologies often fall short of these expectations, such as by presenting virtual audio that does not take into account a user's surroundings, leading to feelings of inauthenticity that can compromise the user experience. Observations of users of XR systems indicate that while users may be relatively forgiving of visual mismatches between virtual content and a real environment (e.g., inconsistencies in lighting); users may be more sensitive to auditory mismatches. Our own auditory experiences, refined continuously throughout our lives, can make us acutely aware of how our physical environments affect the sounds we hear; and we can be hyper-aware of sounds that are inconsistent with those expectations. With XR systems, such inconsistencies can be jarring, and can turn an immersive and compelling experience into a gimmicky, imitative one. In extreme examples, auditory inconsistencies can cause motion sickness and other ill effects as the inner ear is unable to reconcile auditory stimuli with their corresponding visual cues.

The present invention is directed to addressing these shortcomings by presenting a virtual sound to a user, with the presentation of the sound incorporating one or more playback parameters based on aspects of the user's real environment. For example, the presentation can incorporate a simulated reverb effect, where one or more parameters of the reverb depend on attributes of the user's real environment, such as the cubic volume of the room, or the materials of the walls of the room. By taking into account the characteristics of the user's physical environment, the systems and methods described herein can simulate what would be heard by a user if the virtual sound were a real sound, generated naturally in that environment. By presenting virtual sounds in a manner that is faithful to the way sounds behave in the real world, the user may experience a heightened sense of connectedness to the mixed reality environment. Similarly, by presenting location-aware virtual content that responds to the user's movements and environment, the content becomes more subjective, interactive, and real— for example, the user's experience at Point A can be entirely different from his or her experience at Point B. This enhanced realism and interactivity can provide a foundation for new applications of mixed reality, such as those that use spatially-aware audio to enable novel forms of gameplay, social features, or interactive behaviors.

BRIEF SUMMARY

Systems and methods of presenting an audio signal to a user of a mixed reality environment is disclosed. According to an example method, an audio event associated with the mixed reality environment is detected. The audio event is associated with a first audio signal. A location of the user with respect to the mixed reality environment is determined. An acoustic region associated with the location of the user is identified. A first acoustic parameter associated with the first acoustic region is determined. A transfer function is determined using the first acoustic parameter. The transfer function is applied to the first audio signal to produce a second audio signal, which is then presented to the user.

BRIEF DESCRIPTION OF THE DRAWINGS

FIGS. 16-20 illustrate flow charts of example processes for presenting an audio signal to a user of a mixed reality system, according to one or more examples of the disclosure.

DETAILED DESCRIPTION

Figure 1A:
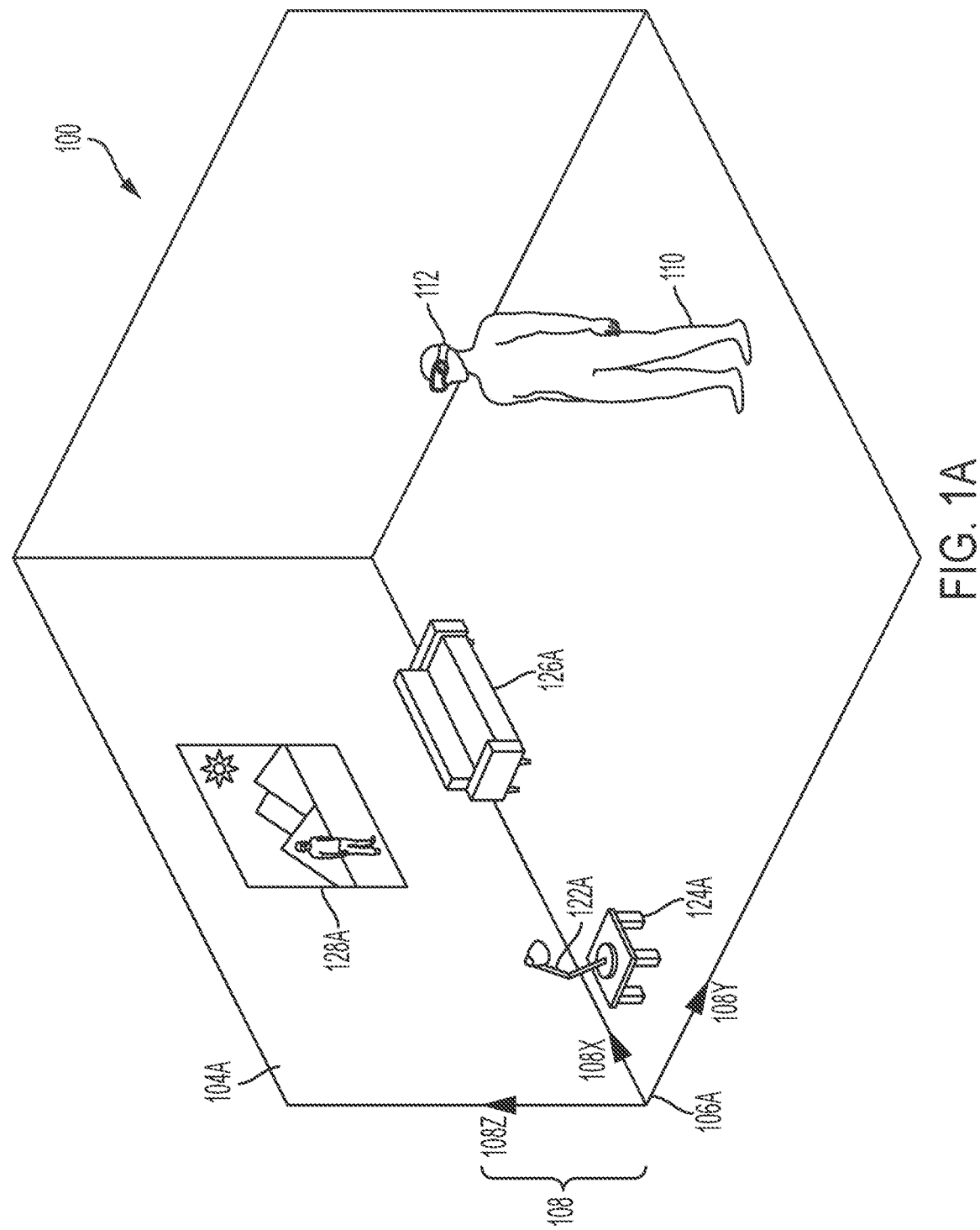
FIGS. 1A-1C illustrates an example mixed reality environment, according to one or more examples of the disclosure.

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

Mixed Reality Environment

Like all people, a user of a mixed reality system exists in a real environment—that is, a three-dimensional portion of the "real world," and all of its contents, that are perceptible by the user. For example, a user perceives a real environment using one's ordinary human senses—sight, sound, touch, taste, smell—and interacts with the real environment by moving one's own body in the real environment. Locations in a real environment can be described as coordinates in a coordinate space; for example, a coordinate can comprise latitude, longitude, and elevation with respect to sea level; distances in three orthogonal dimensions from a reference point; or other suitable values. Likewise, a vector can describe a quantity having a direction and a magnitude in the coordinate space.

A computing device can maintain, for example in a memory associated with the device, a representation of a virtual environment. As used herein, a virtual environment is a computational representation of a three-dimensional space. A virtual environment can include representations of an object, action, signal, parameter, coordinate, vector, or other characteristic associated with that space. In some examples, circuitry (e.g., a processor) of a computing device can maintain and update a state of a virtual environment; for instance, a processor can determine at a first time t0, based on data associated with the virtual environment and/or input provided by a user, a state of the virtual environment at a second time t1. For instance, if an object in the virtual environment is located at a first coordinate at time t0, and has certain programmed physical parameters (e.g., mass, coefficient of friction); and an input received from user indicates that a force should be applied to the object in a direction vector; the processor can apply laws of kinematics to determine a location of the object at time t1 using basic mechanics. The processor can use any suitable information known about the virtual environment, and/or any suitable input, to determine a state of the virtual environment at a time t1. In maintaining and updating a state of a virtual environment, the processor can execute any suitable software, including software relating to the creation and deletion of virtual objects in the virtual environment; software (e.g., scripts) for defining behavior of virtual objects or characters in the virtual environment; software for defining the behavior of signals (e.g., audio signals) in the virtual environment; software for creating and updating parameters associated with the virtual environment; software for generating audio signals in the virtual environment; software for handling input and output; software for implementing network operations; software for applying asset data (e.g., animation data to move a virtual object over time); or many other possibilities.

Output devices, such as displays or speakers, can present aspects of a virtual environment to a user. For example, a virtual environment may include virtual objects (which may include representations of objects; people; animals; lights; etc.) that may be visually presented to a user. A processor can determine a view of the virtual environment (for example, corresponding to a camera with an origin coordinate, a view axis, and a frustum); and render, to a display, a viewable scene of the virtual environment corresponding to that view. Any suitable rendering technology may be used for this purpose. In some examples, the viewable scene may include only a subset of virtual objects in the virtual environment, and exclude certain other virtual objects. Similarly, a virtual environment may include audio aspects that may be presented to a user as one or more audio signals. For instance, a virtual object in the virtual environment may generate a spatialized sound originating from a location coordinate of the object (e.g., a virtual character may speak or cause a sound effect); or the virtual environment may be associated with musical cues or ambient sounds that may or may not be associated with a particular location. A processor can determine an audio signal corresponding to a "user" coordinate—for instance, an audio signal corresponding to a composite of sounds in the virtual environment, and rendered to simulate an audio signal that would be heard by a user at the user coordinate—and present the audio signal to a user via one or more speakers. In some examples, a user can be associated with two or more listener coordinates—for example, first and second listener coordinates corresponding to the user's left and right ears, respectively—and audio signals can be rendered individually with respect to each listener coordinate.

Because a virtual environment exists only as a computational structure, a user cannot directly perceive a virtual environment using one's ordinary senses. Instead, a user can perceive a virtual environment indirectly, as presented to the user, for example by a display, speakers, haptic feedback devices, etc. Similarly, a user cannot directly touch, manipulate, or otherwise interact with a virtual environment; but can provide input data, via input devices or sensors, to a processor that can use the device or sensor data to update the virtual environment. For example, a camera sensor can provide optical data indicating that a user is trying to touch an object in a virtual environment, and a processor can use that data to cause the object to respond accordingly in the virtual environment.

A mixed reality system can present to the user, for example using a transmissive display and/or one or more speakers incorporated into a head-mounted wearable unit, a mixed reality environment ("MRE") that combines aspects of a real environment and a virtual environment. As used herein, a MRE is a simultaneous representation of a real environment and a corresponding virtual environment. In some examples, the corresponding real and virtual environments share a single coordinate space; in some examples, a real coordinate space and a corresponding virtual coordinate space are related to each other by a transformation matrix (or other suitable representation). Accordingly, a single coordinate (along with, in some examples, a transformation matrix) can define a first location in the real environment, and also a second, corresponding, location in the virtual environment; and vice versa.

In a MRE, a virtual object (e.g., in a virtual environment associated with the MRE) can correspond to a real object (e.g., in a real environment associated with the MRE). For instance, if the real environment of a MRE comprises a real lamp post (a real object) at a location coordinate, the virtual environment of the MRE may comprise a virtual lamp post (a virtual object) at a corresponding location coordinate. As used herein, the real object in combination with its corresponding virtual object together constitute a "mixed reality object." It is not necessary for a virtual object to perfectly match or align with a corresponding real object. In some examples, a virtual object can be a simplified version of a corresponding real object. For instance, if a real environment includes a real lamp post, a corresponding virtual object may comprise a cylinder of roughly the same height and radius as the real lamp post (reflecting that lamp posts may be roughly cylindrical in shape). Simplifying virtual objects in this manner can allow computational efficiencies, and can simplify calculations to be performed on such virtual objects. Further, in some examples of a MRE, not all real objects in a real environment may be associated with a corresponding virtual object. Likewise, in some examples of a MRE, not all virtual objects in a virtual environment may be associated with a corresponding real object. That is, some virtual objects may solely in a virtual environment of a MRE, without any real-world counterpart.

In some examples, virtual objects may have characteristics that differ, sometimes drastically, from those of corresponding real objects. For instance, while a real environment in a MRE may comprise a green, two-armed cactus—a prickly inanimate object—a corresponding virtual object in the MRE may have the characteristics of a green, two-armed virtual character with human facial features and a surly demeanor. In this example, the virtual object resembles its corresponding real object in certain characteristics (color, number of arms); but differs from the real object in other characteristics (facial features, personality). In this way, virtual objects have the potential to represent real objects in a creative, abstract, exaggerated, or fanciful manner; or to impart behaviors (e.g., human personalities) to otherwise inanimate real objects. In some examples, virtual objects may be purely fanciful creations with no real-world counterpart (e.g., a virtual monster in a virtual environment at a location corresponding to an empty space in a real environment).

Compared to VR systems, which present the user with a virtual environment while obscuring the real environment, a mixed reality system presenting a MRE allows the real environment to remain perceptible while the virtual environment is presented. Accordingly, the user of the mixed reality system is able to use visual and audio cues associated with the real environment to experience and interact with the corresponding virtual environment. As an example, while a user of VR systems may struggle to perceive or interact with a virtual object displayed in a virtual environment—because, as noted above, a user cannot directly perceive or interact with a virtual environment—a user of an MR system may find it intuitive and natural to interact with a virtual object by seeing, hearing, and touching a corresponding real object in his or her own real environment. This level of interactivity can heighten a user's feelings of immersion, connection, and engagement with a virtual environment. Similarly, by simultaneously presenting a real environment and a virtual environment, mixed reality systems can reduce negative psychological feelings (e.g., cognitive dissonance) and negative physical feelings (e.g., motion sickness) associated with VR systems. Mixed reality systems further offer many possibilities for applications that may augment or alter our experiences of the real world.

FIG. 1A illustrates an example real environment 100 in which a user 110 uses a mixed reality system 112. Mixed reality system 112 may comprise a display (e.g., a transmissive display) and one or more speakers, and one or more sensors (e.g., a camera), for example as described below. The real environment 100 shown comprises a rectangular room 104A, in which user 110 is standing; and real objects 122A (a lamp), 124A (a table), 126A (a sofa), and 128A (a painting). Room 104A further comprises a corner 106A, which may be considered an origin of the real environment 100. As shown in FIG. 1A, an environment coordinate system 108 (comprising an x-axis 108X, a y-axis 108Y, and a z-axis 108Z) with its origin at corner 106A, can define a coordinate space for real environment 100. In some examples, user 110 may be considered a real object in real environment 100; similarly, user 110's body parts (e.g., hands, feet) may be considered real objects in real environment 100. In some examples, a user coordinate system 114 relative to mixed reality system 112 can be defined. This can simplify the representation of locations relative to the user's head, or to a head-mounted device. Using SLAM, visual odometry, or other techniques, a transformation between user coordinate system 114 and environment coordinate system 108 can be determined and updated in real-time.

Figure 1B:
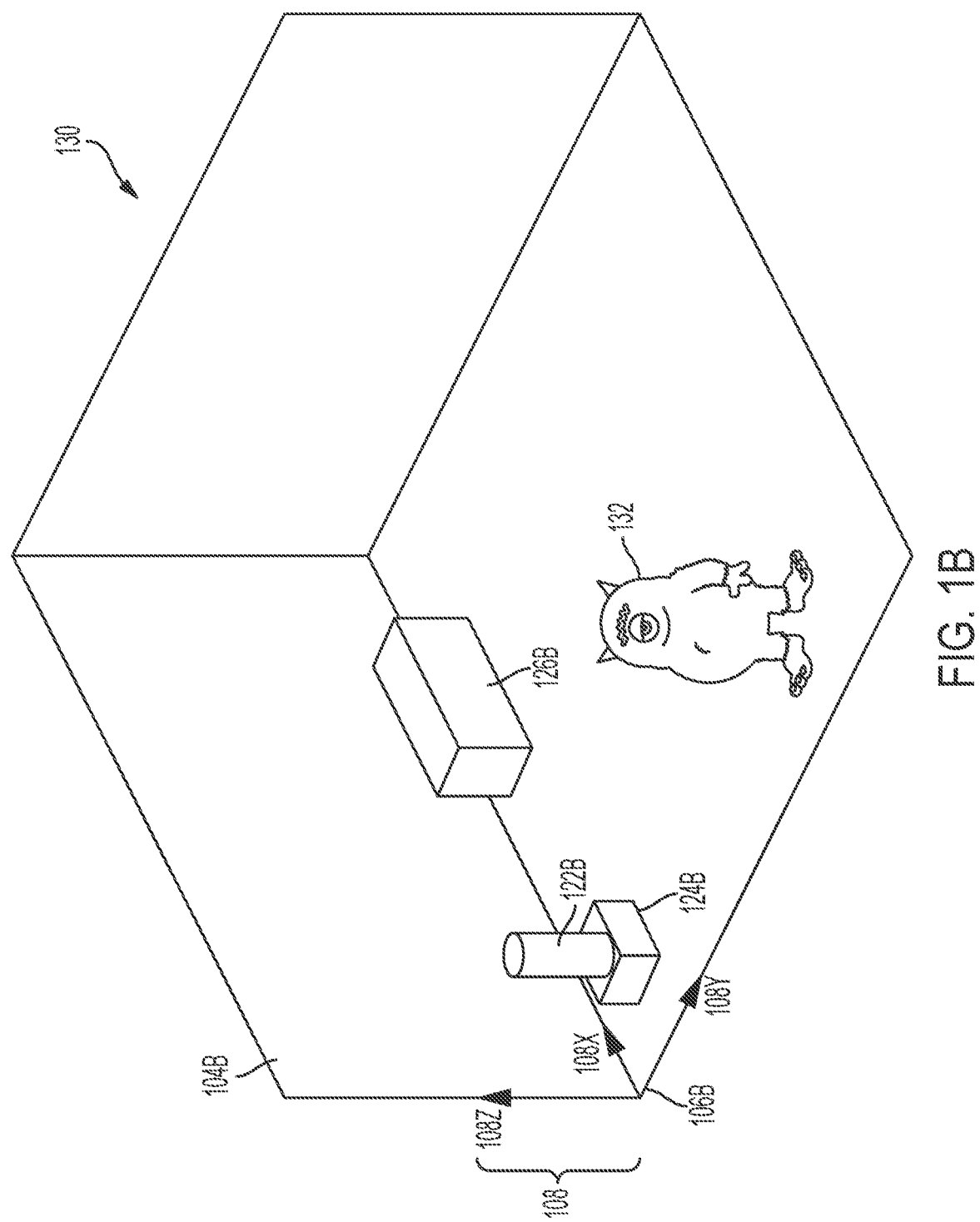

FIG. 1B illustrates an example virtual environment 130 that corresponds to real environment 100. The virtual environment 130 shown comprises a virtual rectangular room 104B corresponding to real rectangular room 104A; a virtual object 122B corresponding to real object 122A; a virtual object 124B corresponding to real object 124A; and a virtual object 126B corresponding to real object 126A. Metadata associated with the virtual objects 122B, 124B, 126B can include information derived from the corresponding real objects 122A, 124A, 126A. Virtual environment 130 additionally comprises a virtual monster 132, which does not correspond to any real object in real environment 100. Similarly, real object 128A in real environment 100 does not correspond to any virtual object in virtual environment 130. Virtual room 104B comprises a corner 106B, which corresponds to corner 106A of real room 104A and may be considered an origin of the virtual environment 130. As shown in FIG. 1B, coordinate system 108 (comprising an x-axis 108X, a y-axis 108Y, and a z-axis 108Z) with its origin at corner 106B can define a coordinate space for virtual environment 130.

With respect to FIGS. 1A and 1B, coordinate system 108 defines a shared coordinate space for both real environment 100 and virtual environment 130. In the example shown, the coordinate space has its origin at corner 106A in real environment 100, and at corner 106B in virtual environment 130. Further, the coordinate space is defined by the same three orthogonal axes (108X, 108Y, 108Z) in both real environment 100 and virtual environment 130. Accordingly, a first location in real environment 100, and a second, corresponding location in virtual environment 130, can be described with respect to the same coordinate space. This simplifies identifying and displaying corresponding locations in real and virtual environments, because the same coordinates can be used to identify both locations. However, in some examples, corresponding real and virtual environments need not use a shared coordinate space. For instance, in some examples (not shown), a matrix (or other suitable representation) can characterize a transformation between a real environment coordinate space and a virtual environment coordinate space.

Figure 1C:
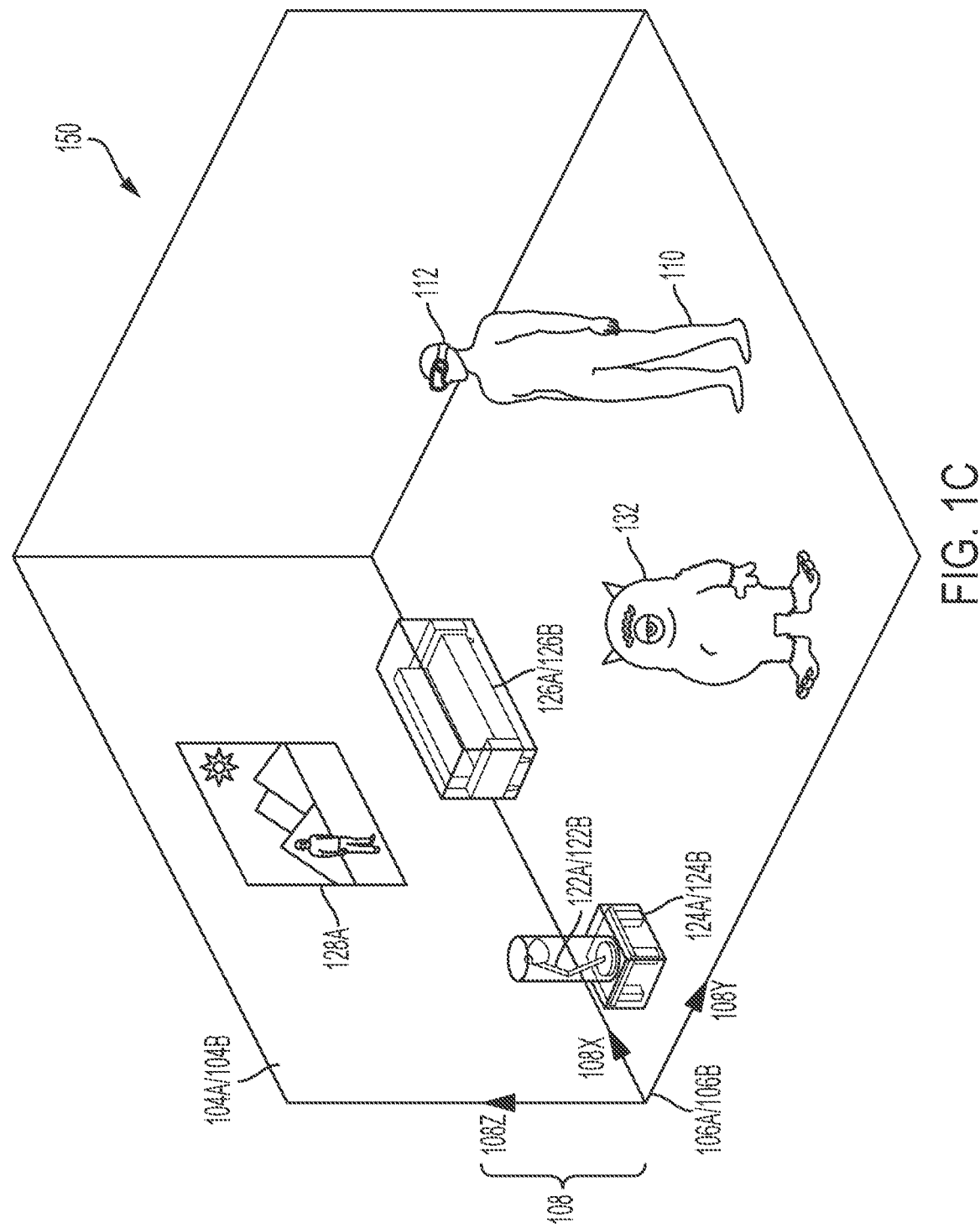

FIG. 1C illustrates an example MRE 150 that simultaneously presents aspects of real environment 100 and virtual environment 130 to user 110 via mixed reality system 112. In the example shown, MRE 150 simultaneously presents user 110 with real objects 122A, 124A, 126A, and 128A from real environment 100 (e.g., via a transmissive portion of a display of mixed reality system 112); and virtual objects 122B, 124B, 126B, and 132 from virtual environment 130 (e.g., via an active display portion of the display of mixed reality system 112). As above, room corner 106A/106B acts as an origin for a coordinate space corresponding to MRE 150, and coordinate system 108 defines an x-axis, y-axis, and z-axis for the coordinate space.

In the example shown, mixed reality objects comprise corresponding pairs of real objects and virtual objects (i.e., 122A/122B, 124A/124B, 126A/126B) that occupy corresponding locations in coordinate space 108. In some examples, both the real objects and the virtual objects may be simultaneously visible to user 110. This may be desirable in, for example, instances where the virtual object presents information designed to augment a view of the corresponding real object (such as in a museum application where a virtual object presents the missing pieces of an ancient damaged sculpture). In some examples, the virtual objects (122B, 124B, and/or 126B) may be displayed (e.g., via active pixelated occlusion using a pixelated occlusion shutter) so as to occlude the corresponding real objects (122A, 124A, and/or 126A). This may be desirable in, for example, instances where the virtual object acts as a visual replacement for the corresponding real object (such as in an interactive storytelling application where an inanimate real object becomes a "living" character).

In some examples, real objects (e.g., 122A, 124A, 126A) may be associated with virtual content or helper data that may not necessarily constitute virtual objects. Virtual content or helper data can facilitate processing or handling of virtual objects in the mixed reality environment. For example, such virtual content could include two-dimensional representations of corresponding real objects; custom asset types associated with corresponding real objects; or statistical data associated with corresponding real objects. This information can enable or facilitate calculations involving a real object without incurring the computational overhead associated with creating and associating a virtual object corresponding to the real object.

In some examples, the presentation described above may also incorporate audio aspects. For instance, in MRE 150, virtual monster 132 could be associated with one or more audio signals, such as a footstep sound effect that is generated as the monster walks around MRE 150. As described further below, a processor of mixed reality system 112 can compute an audio signal corresponding to a mixed and processed composite of all such sounds in MRE 150, and present the audio signal to user 110 via a speaker included in mixed reality system 112.

Example Mixed Reality System

Example mixed reality system 112 can include a wearable head-mounted unit (e.g., a wearable augmented reality or mixed reality headgear unit) comprising a display (which may comprise left and right transmissive displays, which may be near-eye displays, and associated components for coupling light from the displays to the user's eyes); left and right speakers (e.g., positioned adjacent to the user's left and right ears, respectively); an inertial measurement unit (IMU) (e.g., mounted to a temple arm of the device); an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, a mixed reality system 112 can incorporate any suitable display technology, and any suitable sensors (e.g., optical, infrared, acoustic, LIDAR, EOG, GPS, magnetic). In addition, mixed reality system 112 may incorporate networking features (e.g., Wi-Fi capability) to communicate with other devices and systems, including other mixed reality systems. Mixed reality system 112 may further include a battery (which may be mounted in an auxiliary unit, such as a belt pack designed to be worn around a user's waist), a processor, and a memory. The head-mounted unit of mixed reality system 112 may include tracking components, such as an IMU or other suitable sensors, configured to output a set of coordinates of the head-mounted unit relative to the user's environment. In some examples, tracking components may provide input to a processor performing a Simultaneous Localization and Mapping (SLAM) and/or visual odometry algorithm. In some examples, mixed reality system 112 may also include a handheld controller 300, and/or an auxiliary unit 320, which may be a wearable beltpack, as described further below.

Figure 2:
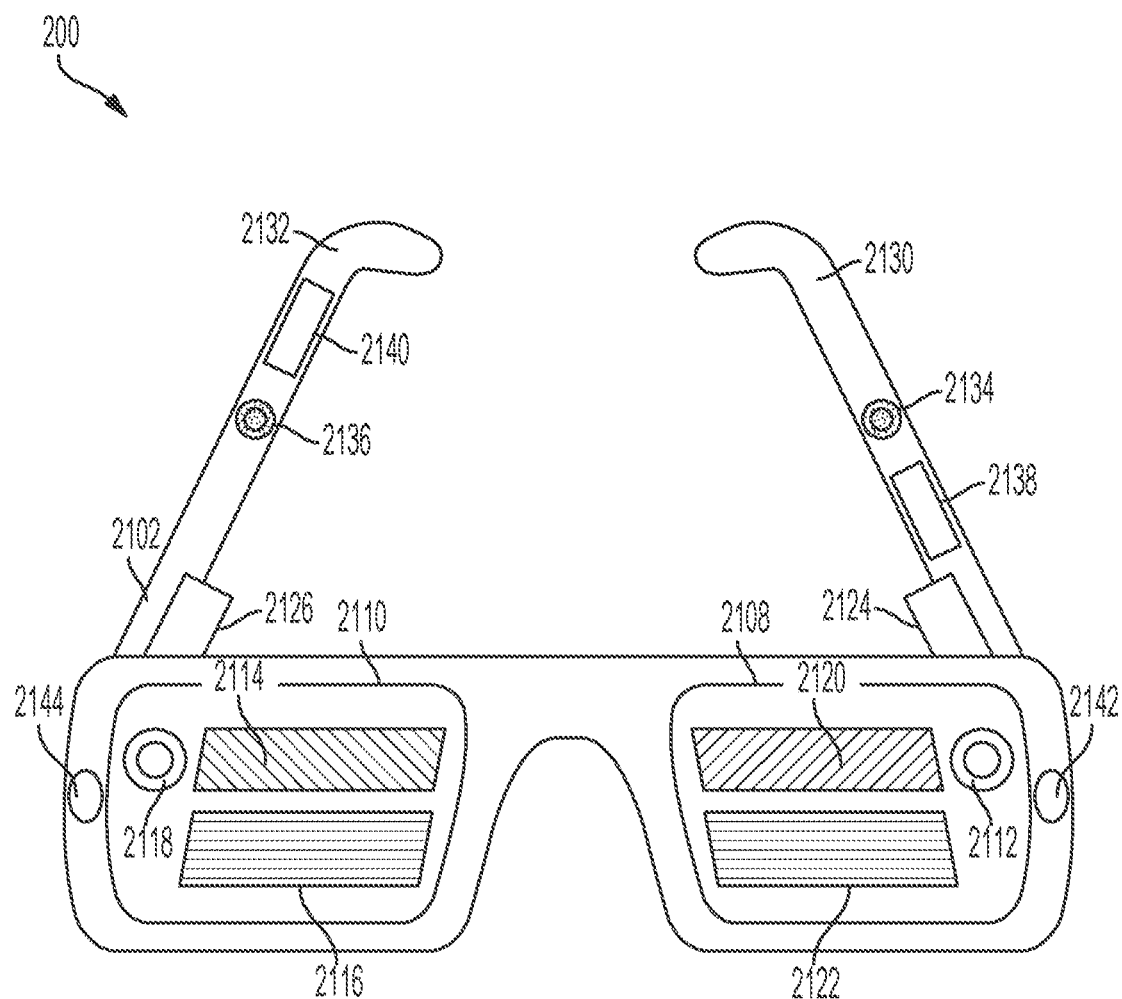
FIG. 2 illustrates an example wearable head unit of an example mixed reality system, according to one or more examples of the disclosure.
Figure 3A:
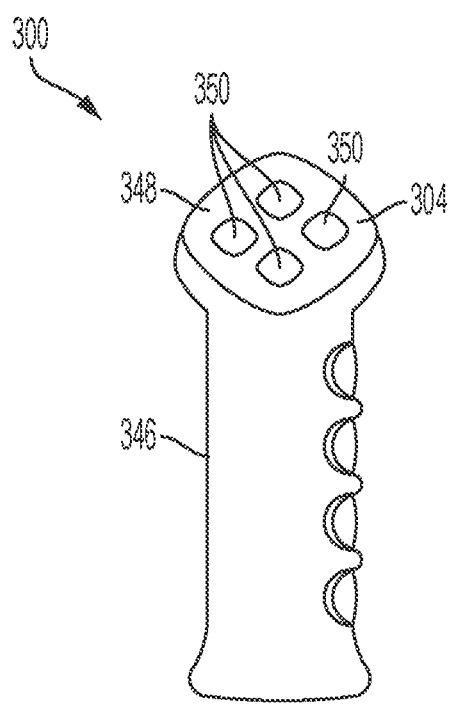
FIG. 3A illustrates an example mixed reality handheld controller that can be used to provide input to a mixed reality environment, according to one or more examples of the disclosure.
Figure 3B:
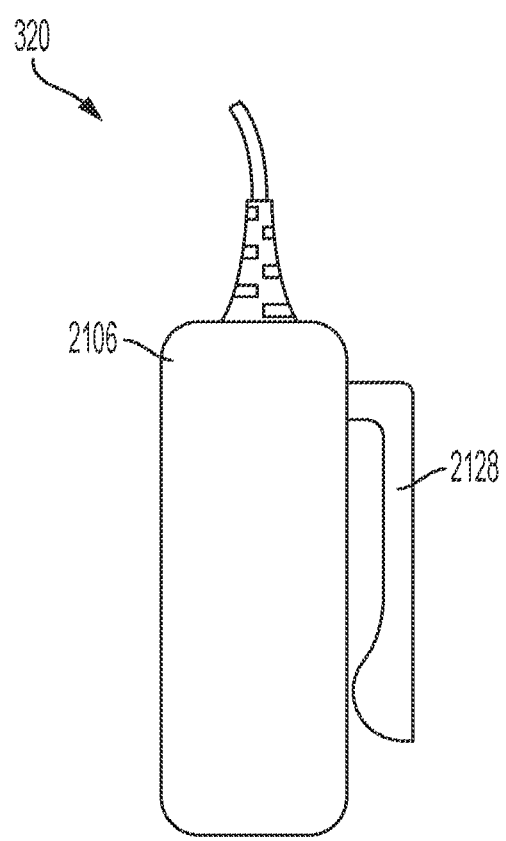
FIG. 3B illustrates an example auxiliary unit that can be included in an example mixed reality system, according to one or more examples of the disclosure.

FIGS. 2, 3A and 3B together illustrate an example mixed reality system (which may correspond to mixed reality system 112) that may be used to present a MRE (which may correspond to MRE 150) to a user. FIG. 2 illustrates an example wearable head unit 200 of the example mixed reality system, which may be a head-mountable system configured to be worn on the head of a user. In the example shown, wearable head unit 200 (which may be, e.g., a wearable augmented reality or mixed reality headgear unit) comprises a display (which may comprise left and right transmissive displays, and associated components for coupling light from the displays to the user's eyes); left and right acoustic structures (e.g., speakers positioned adjacent to the user's left and right ears, respectively); one or more sensors such as radar sensors (including transmitting and/or receiving antennas), infrared sensors, accelerometers, gyroscopes, magnetometers, GPS units, inertial measurement units (IMU), acoustic sensors; an orthogonal coil electromagnetic receiver (e.g., mounted to the left temple piece); left and right cameras (e.g., depth (time-of-flight) cameras) oriented away from the user; and left and right eye cameras oriented toward the user (e.g., for detecting the user's eye movements). However, wearable head unit 200 can incorporate any suitable display technology, and any suitable number, type, or combination of components without departing from the scope of the invention. In some examples, wearable head unit 200 may incorporate one or more microphones configured to detect audio signals generated by the user's voice; such microphones may be positioned in a wearable head unit adjacent to the user's mouth. In some examples, wearable head unit 200 may incorporate networking or wireless features (e.g., Wi-Fi capability, Bluetooth) to communicate with other devices and systems, including other wearable systems. Wearable head unit 200 may further include a battery (which may be mounted in an auxiliary unit, such as a belt pack designed to be worn around a user's waist), a processor, and a memory. In some examples, tracking components of wearable head unit 200 may provide input to a processor performing a Simultaneous Localization and Mapping (SLAM) and/or visual odometry algorithm. Wearable head unit 200 may be a first component of a mixed reality system that includes additional system components. In some examples, such a wearable system may also include a handheld controller 300, and/or an auxiliary unit 320, which may be a wearable belt pack, as described further below.

FIG. 3A illustrates an example handheld controller component 300 of an example mixed reality system. In some examples, handheld controller 300 includes a grip portion 346 and one or more buttons 350 disposed along a top surface 348. In some examples, buttons 350 may be configured for use as an optical tracking target, e.g., for tracking six-degree-of-freedom (6DOF) motion of the handheld controller 300, in conjunction with a camera or other optical sensor (which in some examples may be mounted in wearable head unit 200. In some examples, handheld controller 300 includes tracking components (e.g., an IMU, radar sensors (including transmitting and/or receiving antennas), or other suitable sensors or circuitry), for detecting position or orientation, such as position or orientation relative to a wearable head unit or a belt pack. In some examples, such tracking components may be positioned in handle of handheld controller 300 and facing outwards from a surface of the handheld controller 300 (e.g., grip portion 346, top surface 348, and/or bottom surface 352), and/or may be mechanically coupled to the handheld controller. Handheld controller 300 can be configured to provide one or more output signals corresponding to one or more of a pressed state of the buttons; or a position, orientation, and/or motion of the handheld controller 300 (e.g., via an IMU). Such output signals may be used as input to a processor of wearable head unit 200, of handheld controller 300, or of another component of a mixed reality system (e.g., a wearable mixed reality system). Such input may correspond to a position, orientation, and/or movement of the handheld controller (and, by extension, to a position, orientation, and/or movement of a hand of a user holding the controller). Such input may also correspond to a user pressing buttons 350. In some examples, handheld controller 300 can include a processor, a memory, or other suitable computer system components. A processor of handheld controller 300, for example, can be used to execute any suitable process disclosed herein.

FIG. 3B illustrates an example auxiliary unit 320 of a mixed reality system, such as a wearable mixed reality system. The auxiliary unit 320 can include, for example, one or more batteries to provide energy to operate the wearable head unit 200 and/or handheld controller 300, including displays and/or acoustic structures within those components; a processor (which may execute any suitable process disclosed herein); a memory; or any other suitable components of a wearable system. Compared to head-mounted units (e.g., wearable head unit 200) or handheld units (e.g., handheld controller 300), auxiliary unit 320 may be better suited for housing large or heavy components (e.g., batteries), as it may more easily be positioned on parts of a user's body, such as the waist or back, that are comparatively strong and less easily fatigued by heavy items.

In some examples, sensing and/or tracking components may be positioned in auxiliary unit 320. Such components can include, for instance, one or more IMUs and/or radar sensors (including transmitting and/or receiving antennas). In some examples, the auxiliary unit 320 can use such components to determine the positions and/or orientations (e.g., 6DOF locations) of handheld controller 300; the wearable head unit 200; or the auxiliary unit itself. As shown in the example, auxiliary unit 320 can include a clip 2128 for attaching the auxiliary unit 320 to a user's belt. Other form factors are suitable for auxiliary unit 320 and will be apparent, including form factors that do not involve mounting the unit to a user's belt. In some examples, auxiliary unit 320 can be coupled to the wearable head unit 200 through a multiconduit cable that can include, for example, electrical wires and fiber optics. Wireless connections to and from the auxiliary unit 320 can also be used (e.g., Bluetooth, Wi-Fi, or any other suitable wireless technology).

Figure 4:
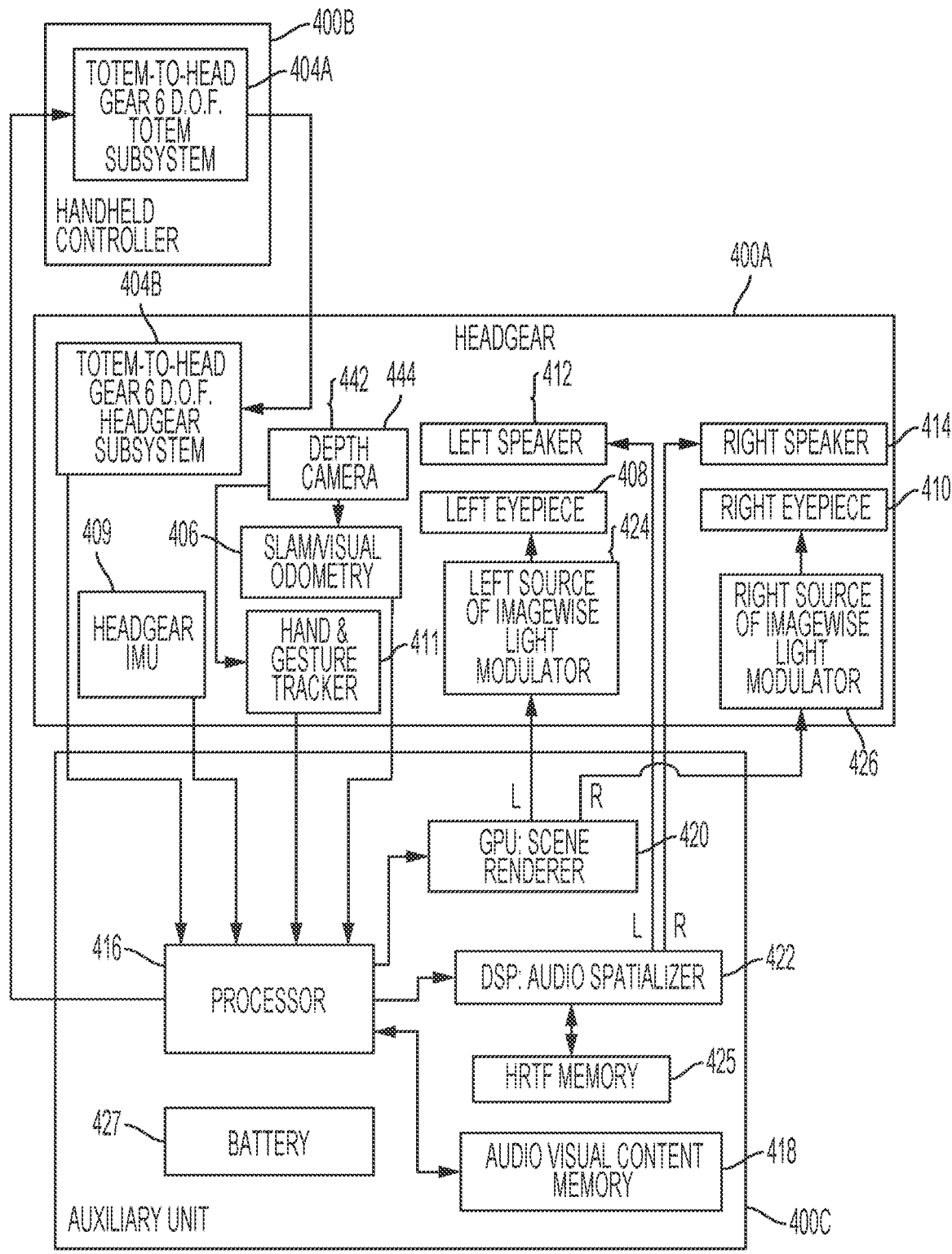
FIG. 4 illustrates an example functional block diagram for an example mixed reality system, according to one or more examples of the disclosure.

FIG. 4 shows an example functional block diagram that may correspond to an example mixed reality system (e.g., a mixed reality system including one or more of the components described above with respect to FIGS. 2, 3A, 3B). As shown in FIG. 4, example handheld controller 400B (which may correspond to handheld controller 300 (a "totem")) can include a totem-to-headgear six degree of freedom (6DOF) totem subsystem 404A and sensors 407; and example augmented reality headgear 400A (which may correspond to wearable head unit 200) can include a totem-to-headgear 6DOF headgear subsystem 404B. In the example, the 6DOF totem subsystem 404A and the 6DOF headgear subsystem 404B can separately or collectively determine three position coordinates and three rotational coordinates of the handheld controller 400B relative to the augmented reality headgear 400A (e.g., relative to a coordinate system of augmented reality headgear 400A). The three positions may be expressed as X, Y, and Z values in such a coordinate system; as a translation matrix; or as some other representation. Position coordinates can be determined though any suitable positioning technique, such as involving radar, sonar, GPS, or other sensors. Rotational coordinates may be expressed as sequence of yaw, pitch, and roll rotations; as a rotation matrix; as a quaternion; or as some other representation.

In some examples, the wearable head unit 400A; one or more depth cameras 444 (and/or one or more non-depth cameras) included in the wearable head unit 400A; and/or one or more optical targets (e.g., buttons 350 of handheld controller 400B as described above, or dedicated optical targets included in the handheld controller 400B) can be used for 6DOF tracking. In some examples, the handheld controller 400B can include a camera, as described above; and the wearable head unit 400A can include an optical target for optical tracking in conjunction with the camera.

In some examples, it may become necessary to transform coordinates from a local coordinate space (e.g., a coordinate space fixed relative to wearable head unit 400A) to an inertial coordinate space (e.g., a coordinate space fixed relative to the real environment). For instance, such transformations may be necessary for a display of wearable head unit 400A to present a virtual object at an expected position and orientation relative to the real environment (e.g., a virtual person sitting in a real chair, facing forward in the real environment, regardless of the headgear's position and orientation), rather than at a fixed position and orientation on the display (e.g., at the same position in the right lower corner of the display). This can preserve the illusion that the virtual object exists in the real environment (and does not, for example, shift or rotate unnaturally in the real environment as the wearable head unit 400A shifts and rotates). In some examples, a compensatory transformation between coordinate spaces can be determined by processing imagery from the depth cameras 444 (e.g., using SLAM and/or visual odometry techniques) in order to determine the transformation of the headgear relative to a coordinate system. In the example shown in FIG. 4, the depth cameras 444 can be coupled to a SLAM/visual odometry block 406 and can provide imagery to block 406. The SLAM/visual odometry block 406 implementation can include a processor configured to process this imagery and determine a position and orientation of the user's head, which can then be used to identify a transformation between a head coordinate space and a real coordinate space. Similarly, in some examples, an additional source of information on the user's head pose and location is obtained from IMU 409 (or another suitable sensor, such as an accelerometer or gyroscope). Information from IMU 409 can be integrated with information from the SLAM/visual odometry block 406 to provide improved accuracy and/or more timely information on rapid adjustments of the user's head pose and position.

In some examples, the depth cameras 444 can supply 3D imagery to a hand gesture tracker 411, which may be implemented in a processor of wearable head unit 400A. The hand gesture tracker 411 can identify a user's hand gestures, for example by matching 3D imagery received from the depth cameras 444 to stored patterns representing hand gestures. Other suitable techniques of identifying a user's hand gestures will be apparent.

In some examples, one or more processors 416 may be configured to receive data from the wearable head unit's headgear subsystem 404B, the radar sensor 408, the IMU 409, the SLAM/visual odometry block 406, depth cameras 444, a microphone 450, and/or the hand gesture tracker 411. The processor 416 can also send and receive control signals from the totem system 404A. The processor 416 may be coupled to the totem system 404A wirelessly, such as in examples where the handheld controller 400B is untethered to other system components. Processor 416 may further communicate with additional components, such as an audiovisual content memory 418, a Graphical Processing Unit (GPU) 420, and/or a Digital Signal Processor (DSP) audio spatializer 422. The DSP audio spatializer 422 may be coupled to a Head Related Transfer Function (HRTF) memory 425. The GPU 420 can include a left channel output coupled to the left source of imagewise modulated light 424 and a right channel output coupled to the right source of imagewise modulated light 426. GPU 420 can output stereoscopic image data to the sources of imagewise modulated light 424, 426. The DSP audio spatializer 422 can output audio to a left speaker 412 and/or a right speaker 414. The DSP audio spatializer 422 can receive input from processor 419 indicating a direction vector from a user to a virtual sound source (which may be moved by the user, e.g., via the handheld controller 320). Based on the direction vector, the DSP audio spatializer 422 can determine a corresponding HRTF (e.g., by accessing a HRTF, or by interpolating multiple HRTFs). The DSP audio spatializer 422 can then apply the determined HRTF to an audio signal, such as an audio signal corresponding to a virtual sound generated by a virtual object. This can enhance the believability and realism of the virtual sound, by incorporating the relative position and orientation of the user relative to the virtual sound in the mixed reality environment—that is, by presenting a virtual sound that matches a user's expectations of what that virtual sound would sound like if it were a real sound in a real environment.

In some examples, such as shown in FIG. 4, one or more of processor 416, GPU 420, DSP audio spatializer 422, HRTF memory 425, and audio/visual content memory 418 may be included in an auxiliary unit 400C (which may correspond to auxiliary unit 320 described above). The auxiliary unit 400C may include a battery 427 to power its components and/or to supply power to another system component, such as wearable head unit 400A and/or handheld controller 400B. Including such components in an auxiliary unit, which can be mounted to a user's waist, can limit the size and weight of wearable head unit 400A, which can in turn reduce fatigue of a user's head and neck.

While FIG. 4 presents elements corresponding to various components of an example mixed reality system, various other suitable arrangements of these components will become apparent to those skilled in the art. For example, elements presented in FIG. 4 as being associated with auxiliary unit 400C could instead be associated with wearable head unit 400A and/or handheld controller 400B. And one or more of wearable head unit 400A, handheld controller 400B, and auxiliary unit 400C can comprise a processor that can execute one or more of the methods disclosed herein. Furthermore, some mixed reality systems may forgo entirely a handheld controller 400B or auxiliary unit 400C. Such changes and modifications are to be understood as being included within the scope of the disclosed examples.

Figure 5:
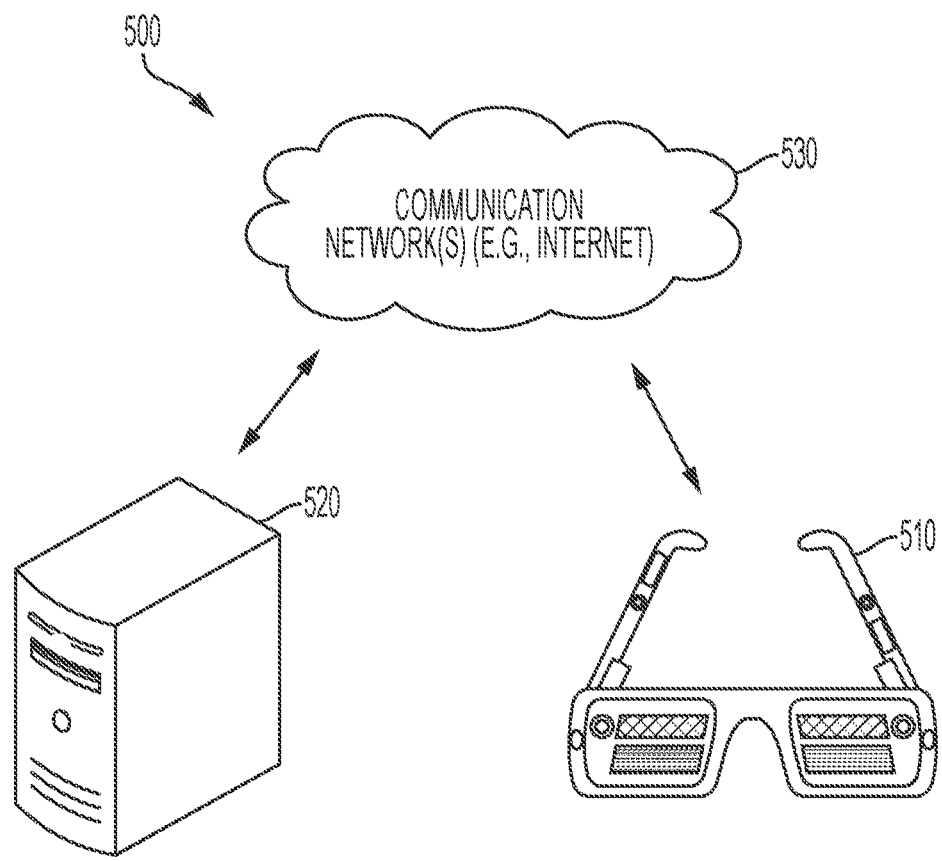
FIG. 5 illustrates an example configuration of components of an example mixed reality system, according to one or more examples of the disclosure.

FIG. 5 shows an example configuration in which a client device 510 (which may be a component of a mixed reality system, including a wearable mixed reality system) communicates with a server 520 via a communication network 530. A client device 510 can comprise, for example, one or more of wearable head unit 200, handheld controller 300, and auxiliary unit 320, such as described above. A server 520 can comprise one or more dedicated server machines (which may include, e.g., one or more cloud servers); but, in some examples, may comprise one or more of a wearable head unit 200, handheld controller 300, and/or auxiliary unit 320 that can behave as a server. The server 520 can be in communication with one or more client devices, including client component 510, via communication network 530 (e.g., via the internet, and/or via a wireless network). The server 520 can maintain a persistent world state with which one or many users may interact (e.g., via a client device corresponding to each user). Additionally, the server 520 can perform computationally intensive operations that would be prohibitive to execute on "thin" client hardware. Other client-server topologies in addition to the example shown in FIG. 5 will be apparent; for instance, in some examples, a wearable system may act as a server with respect to other wearable system clients. Additionally, in some examples, wearable systems may communicate and share information via a peer-to-peer network. The disclosure is not limited to any particular topology of networked components. Further, examples of the disclosure herein may be implemented on any suitable combination of client and/or server components, including processors belonging to client and server devices.

Virtual Sounds

As described above, a MRE (such as experienced via a mixed reality system, e.g., mixed reality system 112, which may include components such as a wearable head unit 200, handheld controller 300, or auxiliary unit 320 described above) can present audio signals that appear, to a user of the MRE, to originate at a sound source with an origin coordinate in the MRE, and travel in a direction of an orientation vector in the MRE. That is, the user may perceive these audio signals as if they were real audio signals originating from the origin coordinate of the sound source and traveling along the orientation vector.

In some cases, audio signals may be considered virtual in that they correspond to computational signals in a virtual environment. Virtual audio signals can be presented to a user as real audio signals detectable by the human ear, for example as generated via speakers 2134 and 2136 of wearable head unit 200 in FIG. 2.

A sound source may correspond to a real object and/or a virtual object. For example, a virtual object (e.g., virtual monster 132 of FIG. 1C) can emit an audio signal in a MRE, which is represented in the MRE as a virtual audio signal, and presented to the user as a real audio signal. For instance, virtual monster 132 of FIG. 1C can emit a virtual sound corresponding to the monster's speech (e.g., dialogue) or sound effects. Similarly, a real object (e.g., real object 122A of FIG. 1C) can be made to appear to emit a virtual audio signal in a MRE, which is represented in the MRE as a virtual audio signal, and presented to the user as a real audio signal. For instance, real lamp 122A can emit a virtual sound corresponding to the sound effect of the lamp being switched on or off—even if the lamp is not being switched on or off in the real environment. The virtual sound can correspond to a position and orientation of the sound source (whether real or virtual). For instance, if the virtual sound is presented to the user as a real audio signal (e.g., via speakers 2134 and 2136), the user may perceive the virtual sound as originating from the position of the sound source, and traveling in the direction of the orientation of the sound source. Sound sources are referred to herein as "virtual sound sources," even though the underlying object made to apparently emit a sound may itself correspond to a real or virtual object, such as described above.

Some virtual or mixed reality environments suffer from a perception that the environments do not feel real or authentic. One reason for this perception is that audio and visual cues do not always match each other in such environments. For example, if a user is positioned behind a large brick wall in a MRE, the user may expect sounds coming from behind the brick wall to be quieter and more muffled than sounds originating right next to the user. This expectation is based on the user's auditory experiences in the real world, where sounds become quiet and muffled when they pass through large, dense objects. When the user is presented with an audio signal that purportedly originates from behind the brick wall, but that is presented unmuffled and at full volume, the illusion that the sound originates from behind the brick wall is compromised. The entire virtual experience may feel fake and inauthentic, in part because it does not comport with the user's expectations based on real world interactions. Further, in some cases, an "uncanny valley" problem arises, in which even subtle differences between virtual experiences and real experiences can cause heightened feelings of discomfort. It is desirable to improve the user's experience by presenting, in a MRE, audio signals that appear to realistically interact—even in subtle ways—with objects in the user's environment. The more consistent that such audio signals are with the user's expectations, based on real world experience, the more immersive and engaging the user's experience in the MRE can be.

One way that users perceive and understand the environment around them is through audio cues. In the real world, the real audio signals users hear are affected by where those audio signals originate from, in what direction those audio signals propagate, and what objects that audio signals interact with. For example, with all other factors equal, a sound that originates a great distance from a user (e.g., a dog barking in the distance) will appear quieter than the same sound originating from a short distance from the user (e.g., the dog barking in the same room as the user). A user can thus identify a location of a dog in the real environment based in part on the perceived volume of its bark. Likewise, with all other factors equal, a sound that travels away from the user (e.g., the voice of a person who is facing away from the user) will appear less clear and more muffled (i.e., low-pass filtered) than the same sound traveling toward the user (e.g., the voice of a person who is facing toward the user). A user can thus identify the orientation of a person in the real environment based on the perceived characteristics of that person's voice.

A user's perception of real audio signals can also be affected by the presence of objects in the environment with which audio signals interact. That is, a user may perceive not only an audio signal generated by a sound source, but also the reverberations of that audio signal against nearby objects. For example, if a person speaks in a small room with close walls, those walls may cause short, natural reverberated signals to result as the person's voice reflects off of the walls. A user may infer from those reverberations that they are in a small room with close walls. Likewise, a large concert hall or cathedral may cause longer reverberations, from which the user may infer that they are in a large, spacious room. Similarly, reverberations of audio signals may take on various sonic characteristics based on the position or orientation of the surfaces against which those signals reflect, or the materials of those surfaces. For example, reverberations against tiled walls will sound different than reverberations against brick, carpet, drywall, or other materials. These reverberation characteristics can be used by the user to understand—acoustically—the size, shape, and material composition of the space they inhabit.

The above examples illustrate how audio cues can inform a user's perception of the environment around them. These cues can act in combination with visual cues: for example, if the user sees a dog in the distance, the user may expect the sound of that dog's bark to be consistent with that distance (and may feel disconcerted or disoriented if it is not, as in some virtual environments). In some examples, such as in low-light environments, or with respect to visually impaired users, visual cues may be limited or unavailable; in such cases, audio cues may take on a particular importance, and may serve as the user's primary means of understanding their environment.

It may be desirable to present virtual audio signals in a MRE to a user in a manner that incorporates realistic reverberation effects, based on objects in the MRE, so that the user can understand the virtual audio signals to realistically be present in their physical space. Some mixed reality systems can produce a dissonance between the user's auditory experience in the MRE, and the user's auditory experience in the real world, such that audio signals in the MRE do not seem quite right (e.g., the "uncanny valley" problem). Compared to other mixed reality audio systems, the present disclosure may allow for a more nuanced, and believable, presentation of audio signals by taking into account the user's position, orientation, properties of objects in the user's environment, properties of the user's environment, and other characteristics relative to the audio signals and the environment. By presenting a user of a MRE with an audio experience that evokes the audio experiences of their everyday life, a MRE can enhance the user's feeling of immersion and connectedness when engaging with the MRE.

Figure 6:
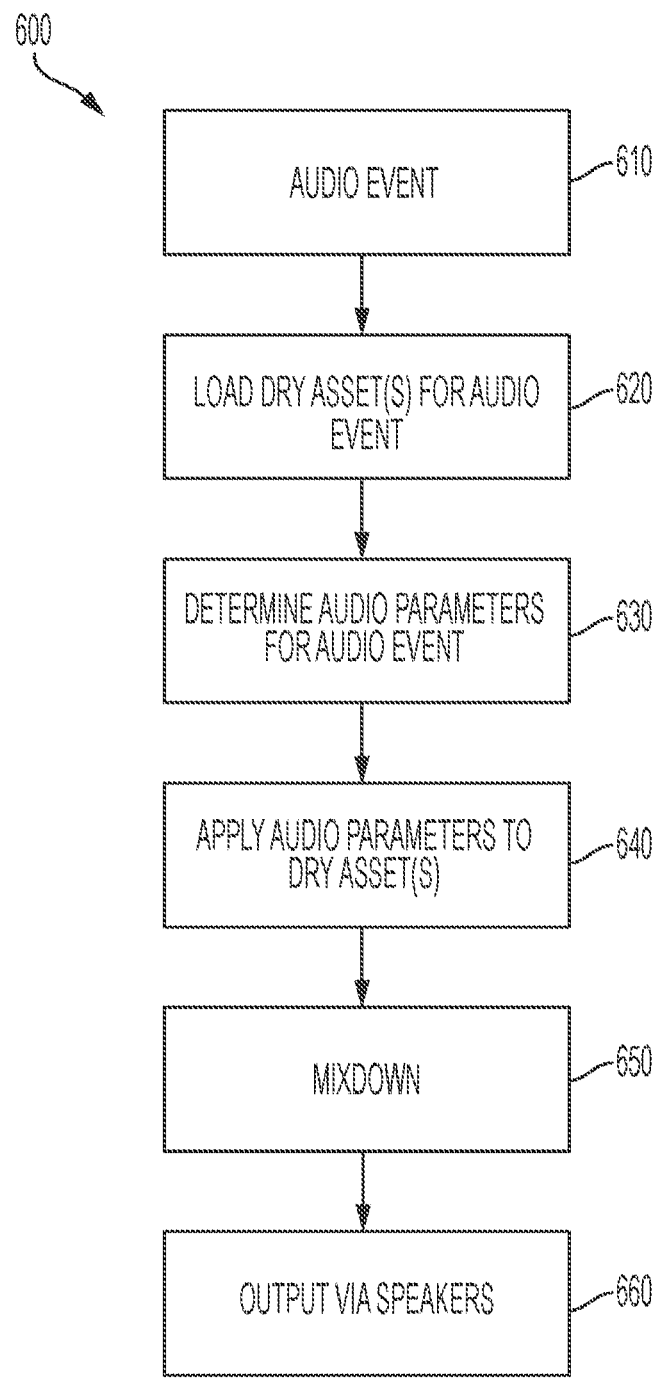
FIG. 6 illustrates a flow chart of an example process for presenting an audio signal in a mixed reality system, according to one or more examples of the disclosure.

FIG. 6 describes an example process 600 of presenting a virtual audio signal to a user of a mixed reality environment (e.g., mixed reality environment 150 of FIG. 1C), according to some embodiments. The user can be using a wearable mixed reality system, such as described above with respect to FIGS. 1-4. According to process 600, an audio event 610 can be identified. The audio event 610 can be associated with one or more audio assets (e.g., a waveform audio file or a live audio stream from a microphone or from a network), and can have a position and orientation in a coordinate system of the MRE. Audio events that are within the user's acoustic space (e.g., close enough to the user to be heard) can be presented to the user via speakers, such as speakers 2134 and 2136 of wearable head unit 200.

According to example process 600, such audio events can be presented to a user of a wearable mixed reality system as follows. At stage 620, one or more raw audio assets associated with the audio event 610 can be loaded in memory of the wearable system, or otherwise prepared for presentation via the wearable system (e.g., by loading a portion of an audio stream in a streaming audio buffer). A raw audio asset can include one or more static audio files, or a portion of such audio files (e.g., one or more samples of the files); and/or may include a real-time audio feed, such as the output of a microphone, or an audio stream received via the Internet. In some examples, it may be preferable for such raw audio assets to be "dry," with minimal effects or processing applied to the raw audio assets.

At stage 630, one or more acoustic parameters can be determined that, when applied to a raw audio asset at stage 640 to create a processed audio signal, can enhance the audio asset by adding sonic characteristics consistent with the user's current acoustic environment (e.g., the current "room"). These acoustic parameters can correspond to acoustic effects that the room would impart on a base sound generated within that room. Such acoustic parameters can include parameters corresponding to, for example, attenuation of the base sound (e.g., a volume drop-off); filtering of the base sound (e.g., a low-pass filter); phase shift of the base sound; pitch modulation of the base sound; or other acoustic effects. Acoustic parameters may also include input parameters (e.g., wet/dry level, attack/decay time) for a reverb engine for applying reverb and echo effects to the base sound. Accordingly, the processed audio signal output by stage 640 can incorporate a simulation of the reverberation, attenuation, filtering, or other effects that would be imparted to the raw audio asset by the walls, surfaces, and/or objects of the room. The application of acoustic parameters at stage 640 can be described as the convolution of one or more transfer functions (e.g., a transfer function H(t)), based on the acoustic parameters, with a raw audio asset to produce the processed audio signal. This process can be performed by an audio engine, which may include a reverb engine, to which the raw audio asset and the appropriate input parameters are supplied. The determination of acoustic parameters at stage 630 is described in more detail below.

The audio signal generated at stage 640 may be a virtual audio signal that is not directly perceptible by a user, but that can be converted to a real audio signal by one or more speakers (e.g., speakers 2134 and/or 2136), so that it can be heard by the user. For example, the audio signal may be a computational representation including a coordinate in the mixed reality environment at which the processed audio signal originates; a vector in the MRE along which the processed audio signal propagates; a time at which the processed audio signal originates; a speed at which the processed audio signal propagates; or other suitable characteristics. At stage 650, one or more virtual audio signals can be mixed down into one or more channels, such as corresponding with a speaker configuration of the wearable head unit 200. For instance, at stage 650, virtual audio signals may be mixed down to left and right channels of a stereo speaker configuration. At stage 660, these mixed down signals are output via the speaker; for example, digital audio data that could be converted to an analog signal via a digital-to-analog converter (e.g., as part of DSP audio spatializer 422 of FIG. 4); and then amplified and used to drive a speaker, producing sound perceptible by a user.

Figure 7:
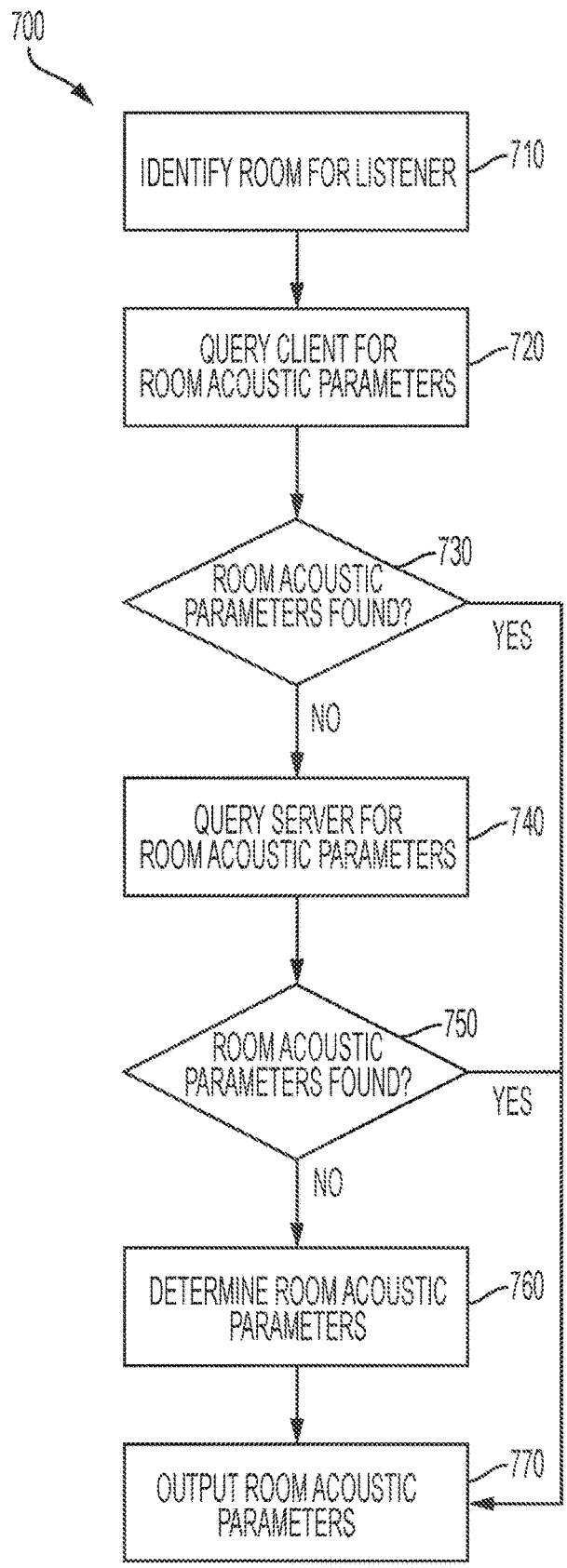
FIGS. 7-8 illustrates flow charts of example processes for determining acoustic parameters of a room of a mixed reality system, according to one or more examples of the disclosure.

FIG. 7 describes an example process 700 for determining acoustic parameters for an audio event, such as described above with respect to stage 630 of example process 600. Example process 700 can be executed, for example, on one or more processors of wearable head unit 200, and/or of a server, such as server 520 described above. As described above, such acoustic parameters can represent the acoustic characteristics of the room in which the audio event occurs. These acoustic characteristics, and thus the acoustic parameters, are determined largely based on/with respect to the physical dimensions of the room; objects present in the room, and the size and shape of those objects; the materials of the room surfaces and of any objects in the room; and the like. As these characteristics of the room may remain constant over time, it can be beneficial to associate an individual room in a MRE with set of acoustic parameters (an "acoustic fingerprint") that describes the acoustic characteristics of that room. This configuration carries several potential advantages. By creating, storing, and retrieving acoustic fingerprints on a per-room basis, acoustic parameters can by easily and efficiently managed, exchanged, and updated, without having to recreate such parameters every time a user enters a room. In addition, as described below, this configuration can simplify the process of generating acoustic parameters that describe a composite of two or more rooms. Further, allowing acoustic parameters for a room to persist over time can enhance feelings of immersion, as one's auditory experience with respect to a physical space in a MRE remains consistent over time (as it does in real-world auditory spaces). And moreover, because the same set of acoustic parameters can be provided to multiple users, multiple users in a single shared space can undergo a common auditory experience, enhancing feelings of connectedness among those users.

The example process 700 describes a system in which acoustic parameters are stored on a per-room basis (although other suitable configurations are possible and are within the scope of the disclosure). At stage 710 of process 700, a room is identified for an audio event; this room can determine the set of audio parameters that should be applied to the audio event. The room can be identified using one or more sensors of a mixed reality system (e.g., sensors of wearable head unit 200). For example, a GPS module of wearable head unit 200 can identify a location of the user, which location can be used to determine a room corresponding to that location. In some examples, the user's location can be determined by triangulation based on locations of nearby Wi-Fi receivers or cellular antennas. In some examples, sensors such as LIDAR, depth cameras, RGB cameras, and/or the like can be used to identify the user's current surroundings, and the sensor output can be compared against a room database to identify a room corresponding to the sensor output. Determining a room from a user's location can be performed based on mapping data and/or architectural records, such as floor plan records, which in some examples may be stored on a server, such as server 520 described above. Other techniques for identifying a room corresponding to the user's current location will be apparent to one of ordinary skill in the art.

In example process 700, it can be queried whether a set of acoustic parameters exists and can be retrieved. At stage 720, a client device (e.g., client device 510 described above, which may include a wearable head unit) can be queried for the acoustic parameters corresponding to the current room. If it is determined that such a set is stored on the client device (stage 730), it can be retrieved and output (stage 770) for use. If the set of acoustic parameters is not stored on the client device, a server (e.g., server 520 described above) can be queried at stage 740 for the acoustic parameters. As above, if it is determined that such a set is stored on the server (stage 750), it can be retrieved and output (stage 770) for use. If a set of acoustic parameters for the current room is not available on either the client device or the server, a new set of acoustic parameters can be created for the room at stage 760, as described in more detail below, with the resulting acoustic parameters output (stage 770) for use; and, as described below, potentially stored on a client device or server device for subsequent retrieval.

Figure 8:
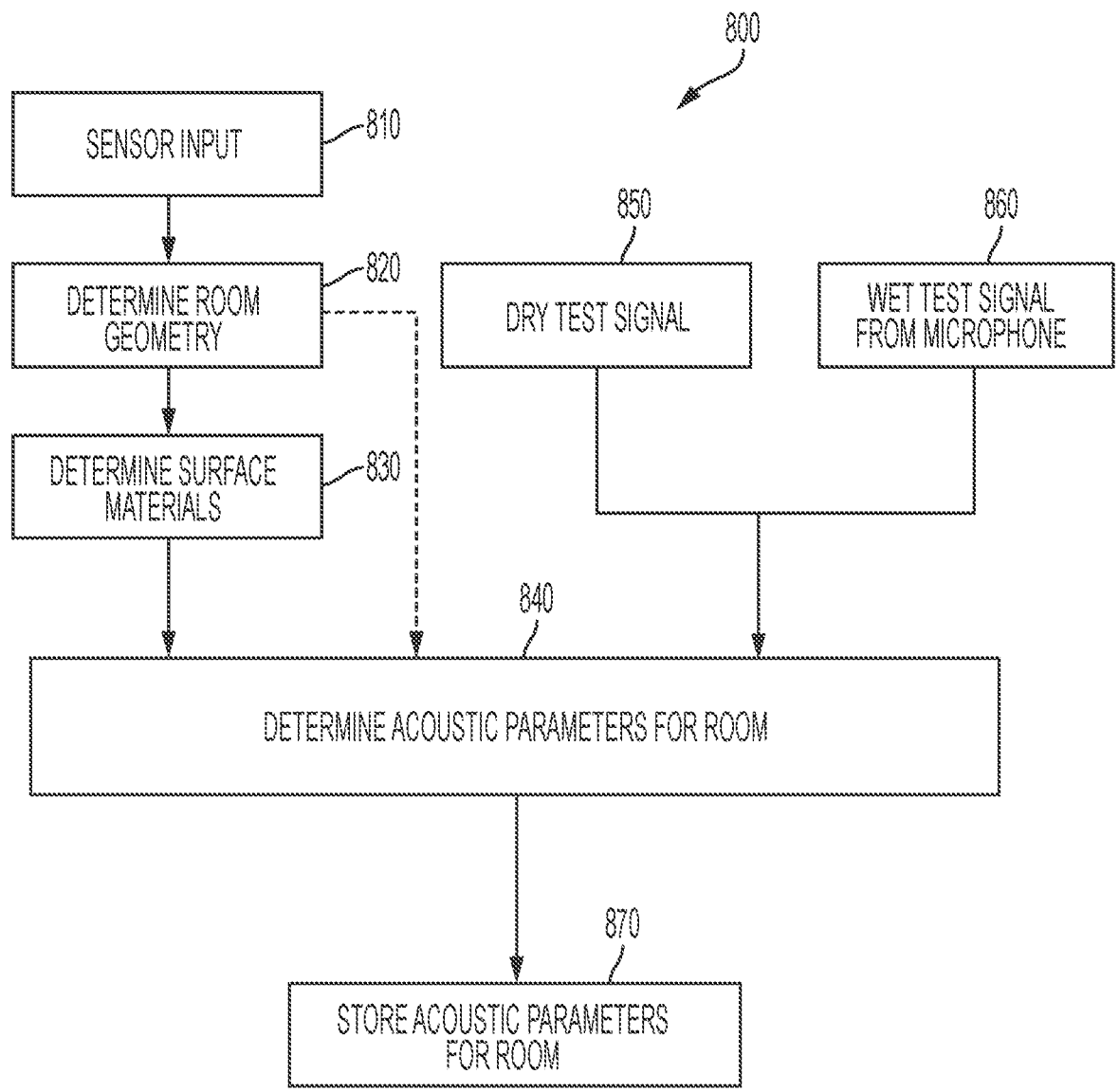

FIG. 8 describes an example process 800 for determining a set of acoustic parameters for a room, such as may be performed at stage 760 of example process 700. Example process 800 can employ any combination of suitable techniques for determining such acoustic parameters. One such technique includes determining acoustic parameters based on data from sensors of a wearable device, such as wearable head unit 200. At stage 810, such sensor data can be provided as input to the example process. Sensor data can include data from a depth camera (e.g., depth cameras 444); a RGB camera; a LIDAR module; a sonar module; a radar module; a GPS receiver; an orientation sensor (e.g., an IMU, gyroscope, or accelerometer); and/or a microphone (e.g., microphone 450). At stage 820, from the sensor input, the geometry of the current room can be determined. Such geometry can include a size, shape, position, and/or orientation of one or more surfaces (e.g., walls, floors, ceilings) and/or objects in the room. This data can affect the acoustic properties of sounds in the room. For example, large, cavernous spaces can cause longer and more prominent reverberations than can smaller spaces. Similarly, rooms full of acoustically dampening objects (e.g., curtains, sofas) can dampen the sounds in those rooms.

Geometry information for a room can be determined based on the sensor input (e.g., camera images showing light reflected by the geometry; LIDAR data providing spatial coordinates corresponding to the geometry), and by utilizing techniques familiar to those of ordinary skill in the art. In some examples, room geometry may be retrieved from a database relating room geometry to geographic coordinates, such as may be provided by a GPS receiver at stage 810. Similarly, in some examples, GPS coordinates can be used to retrieve architectural data (e.g., floor plans) corresponding to the GPS coordinates, and room geometry can be determined using the architectural data.

In addition to the room geometry determined at stage 820, materials corresponding to that geometry can be determined at stage 830. Such materials can exhibit acoustic properties that affect sounds within the room. For example, walls made of tile are acoustically reflective and will exhibit bright reverberations; while floors covered in carpet will exhibit dampening effects. Such materials can be determined using sensor input provided at stage 810. For example, an RGB camera can be used to identify a surface material based on its visual appearance. Other suitable techniques will be apparent to those of ordinary skill in the art. As above, in some examples, surface materials may be retrieved from a database relating surface materials to geographic coordinates, such as may be provided by a GPS receiver at stage 810; or from architectural data corresponding to those coordinates.

At stage 840, room geometry determined at stage 820 and/or surface materials determined at stage 830 can be used to determine corresponding acoustic parameters for the room, representing the acoustic effects that the room geometry and/or surface materials can have on sounds in the room. Various techniques can be used to determine such acoustic parameters. As one example, reverb engine input parameters (e.g., decay time, mix level, attack time, or a selection index to a reverb algorithm) can be determined based on known relationships to the cubic volume of the room. As another example, a physical representation of the room can be constructed based on the sensor input, with an acoustic response model of the room determined mathematically from the representation. As another example, a lookup table can be maintained, associating reverb parameters or filter parameters with surface material types. Where a room includes multiple materials having different acoustic parameters, a composite set of acoustic parameters can be determined, for example by blending the parameters based on the relative surface areas of the room that are covered in each respective material. Other suitable example techniques are described in, e.g., L. Savioja et al., *Creating Interactive Virtual Acoustic Environments,* 47 J. Audio Eng. Soc. 675, 705 n. 9 (1999), and will be familiar to those of ordinary skill in the art.

Another technique for determining the acoustic characteristics of a room includes presenting a known test audio signal via a speaker in the room; recording a "wet" test signal via a microphone in the room; and presenting the test signal (850) and the wet signal (860) for comparison at stage 840. The comparison of the test signal and the wet signal can yield a transfer function that characterizes the acoustic effects of the room on the test signal, for example as described in A. Deb et al., *Time Invariant System Identification: Via 'Deconvolution',* in ANALYSIS AND IDENTIFICATION OF TIME-INVARIANT SYSTEMS, TIME-VARYING SYSTEMS, AND MULTI-DELAY SYSTEMS USING ORTHOGONAL HYBRID FUNCTIONS 319-330 (Springer, $1^{st}$ ed. 2016). In some examples, a "blind" estimation technique may be employed for retrieving room acoustical parameters by recording the wet signal only, as described for instance in J. Jot et al., *Blind Estimation of the Reverberation Fingerprint of Unknown Acoustic Environments,* Audio Engineering Society Convention Paper 9905 (Oct. 18-21, 2017).

In some examples, such as example process 800, multiple techniques for determining acoustic parameters can be combined. For instance, acoustic parameters determined from the test signal and the wet signal, such as described above with respect to stages 850 and 860, can be refined using room geometry and surface materials determined at stages 820 and 830, respectively, and/or vice versa.

Upon determining a set of acoustic parameters for a room at stage 840, the set of acoustic parameters can be stored for later retrieval, to avoid the need to recompute such parameters (which can incur significant computational overhead). The set of acoustic parameters can be stored at a client device (e.g., client device 510, to be retrieved as described above with respect to stage 720 of process 700); at a server device (e.g., server device 520, to be retrieved as described above with respect to stage 740 of process 700); at another suitable storage location; or at some combination of the above.

In some examples, it can be desirable to obtain more realistic acoustic modeling by applying to an audio signal (e.g., at stage 640 of example process 600) acoustic parameters associated with more than one room. For instance, in an acoustic environment that includes more than one acoustic region, or room, audio signals can take on acoustic properties of multiple rooms. Moreover, in a MRE, one or more of such rooms may be virtual rooms, corresponding to acoustic regions that do not necessarily exist in the real environment.

Figure 9:
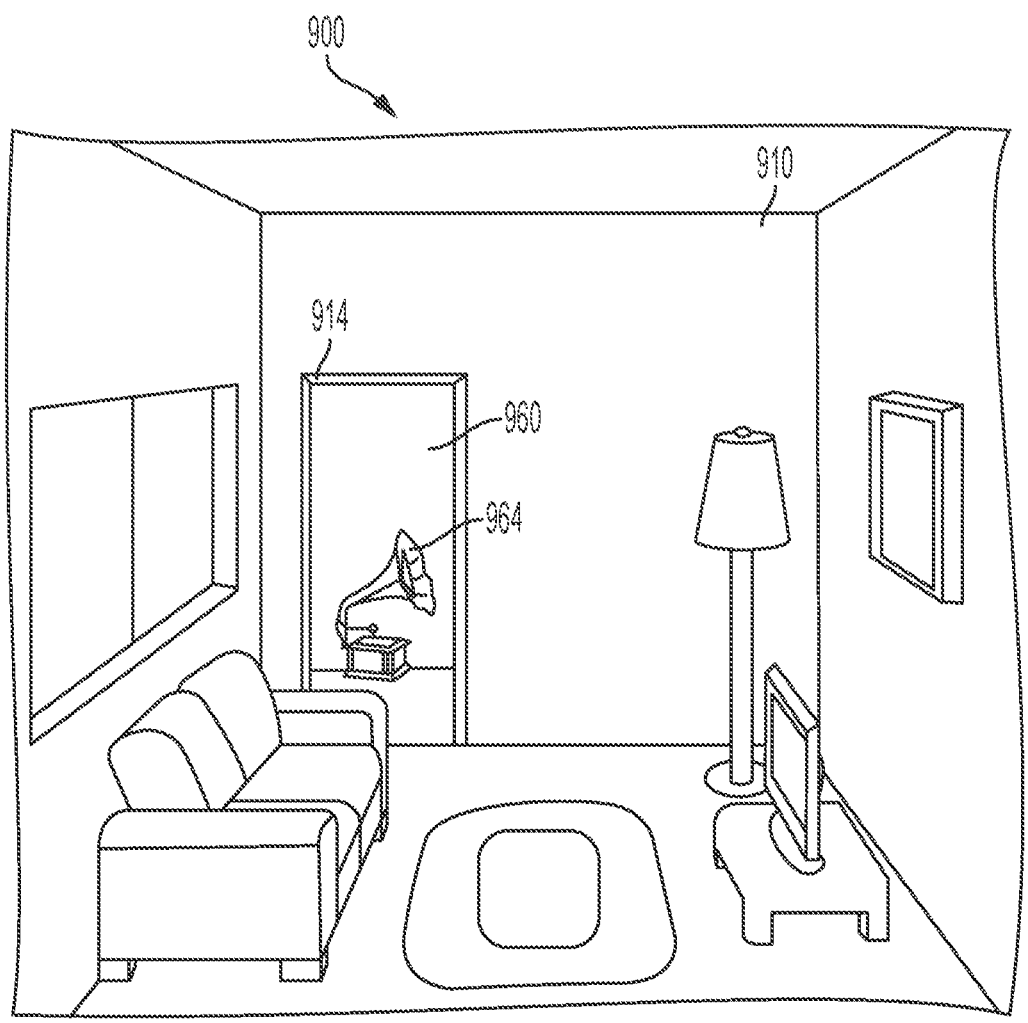
FIG. 9 illustrates an example of acoustically coupled rooms in a mixed reality environment, according to one or more examples of the disclosure.

FIG. 9 illustrates an example interior 900 that includes multiple acoustically connected regions. In FIG. 9, region 910 corresponds to a living room with various objects in the room. A doorway 914 connects living room 910 with a second room, dining room 960. A sound source 964 is positioned in dining room 960. In this real environment, sounds produced by sound source 964 in dining room 960 and heard by a user in living room 910 will take on acoustic characteristics of both dining room 960 and living room 910. In a MRE corresponding to the interior scene 900, a more realistic acoustic experience would result if virtual sounds were to similarly adopt acoustic characteristics of these multiple rooms.

Figure 10:
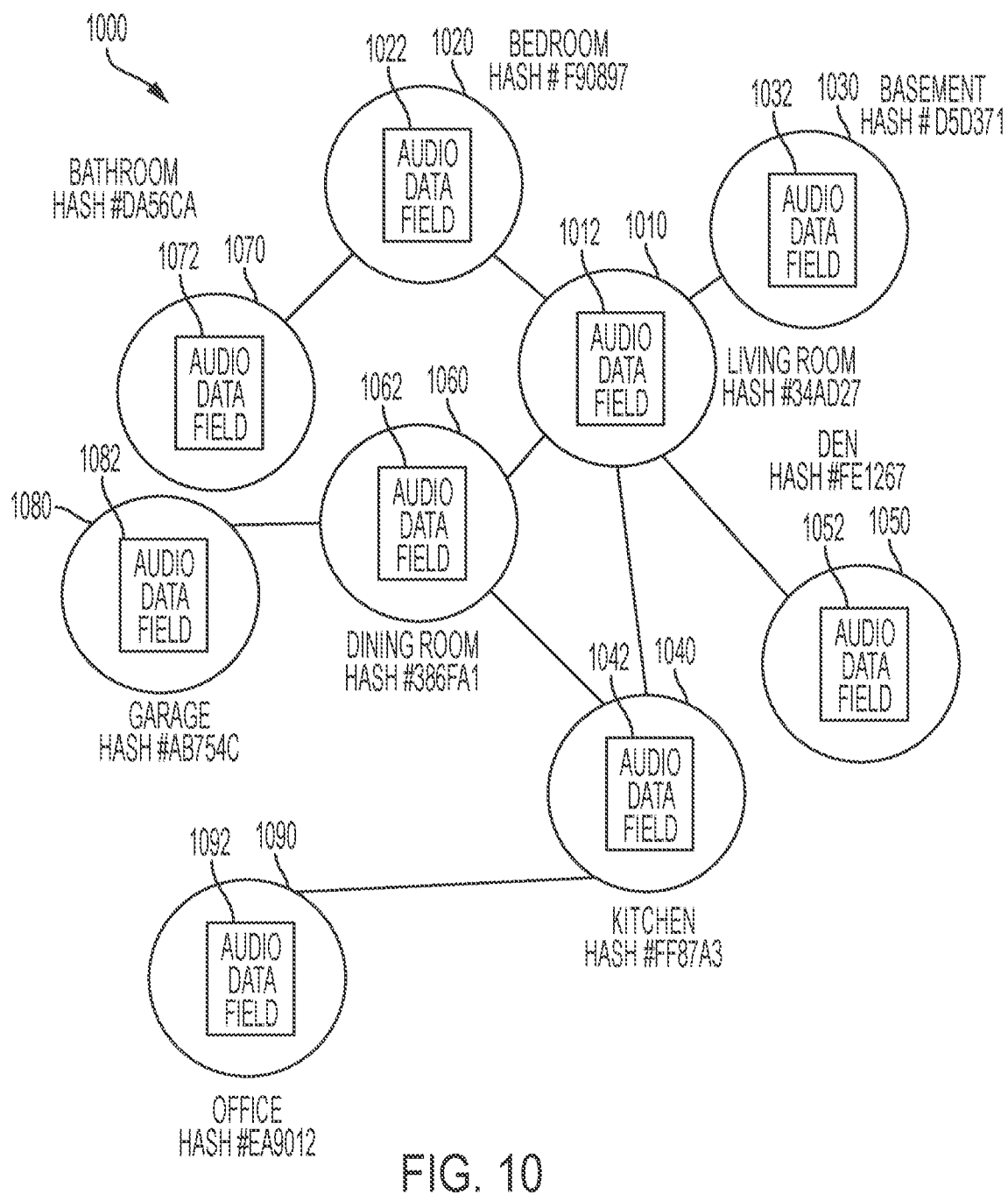
FIG. 10 illustrates an example of an acoustic graph structure, according to one or more examples of the disclosure.

Multiple-room acoustic environments, such as the example interior 900 in FIG. 9, can be represented by an acoustic graph structure that describes acoustic relationships between rooms in an environment. FIG. 10 shows an example acoustic graph structure 1000 that may describe the rooms in a house corresponding to example interior scene 900. Each room in the acoustic graph structure may have its own acoustic characteristics. In some examples, acoustic graph structure 1000 could be stored on a server, such as server 520, where it can be accessed by one or more client devices, such as client device 510. In example acoustic graph structure 1000, living room 910 shown in FIG. 9 is represented by a corresponding room data structure 1010. Room data structure 1010 may be associated with one or more data elements describing aspects of living room 910 (e.g., the size and shape of the room, objects in the room, and the like). In the example, acoustic parameter data structure 1012 is associated with room data structure 1010 and can describe a set of acoustic parameters associated with corresponding living room 910. This set of acoustic parameters can correspond, for example, to a set of acoustic parameters such as described above with respect to FIG. 6, FIG. 7, and FIG. 8.

In acoustic graph structure 1000, rooms in the house may be acoustically connected (e.g., via windows, doorways, or objects through which sound waves can travel). These acoustic connections are shown via lines connecting room data structures in the acoustic graph structure 1000. For instance, the acoustic graph structure 1000 includes a room data structure 1060 that corresponds to dining room 960 in FIG. 9. In the figure, the dining room data structure 1060 is connected by a line to living room data structure 1010; this reflects that, as shown in FIG. 9, the dining room 960 and living room 910 are acoustically coupled via doorway 964. Similar to living room data structure 1010, dining room data structure 1060 is associated with an acoustic parameter data structure 1062, which can describe a set of acoustic parameters associated with corresponding dining room 960. Similarly, acoustic graph structure 1000 includes representations of other rooms in the house (e.g., basement 1030, kitchen 1040, den 1050, bedroom 1020, bathroom 1070, garage 1080, office 1090) and their associated acoustic parameters (e.g., 1032, 1042, 1052, 1022, 1072, 1082, and 1090, corresponding to basement 1030, kitchen 1040, den 1050, bedroom 1020, bathroom 1070, garage 1080, and office 1090, respectively). As indicated in the figure, these rooms and their associated data may be represented using a hash table. Lines connecting the room data structures represent acoustic connections between the rooms. Parameters describing the acoustic connections between rooms can be represented, for example, by data structures associated with the lines; in the acoustic parameter data structures described above (e.g., 1012, 1062); or via some other data structure. Such parameters could include, for instance, the size of an opening (e.g., doorway 914) between the rooms; the thickness and material of a wall between the rooms; and so on. This information can be used to determine the extent to which the acoustic properties of one room affect sounds produced or heard in an acoustically connected room.

Acoustic graph structures such as example acoustic graph structure 1000 can be created or modified using any suitable technique. In some examples, rooms can be added to an acoustic graph structure based on sensor input from a wearable system (e.g., input from sensors such as depth cameras, RGB cameras, LIDAR, sonar, radar, and/or GPS). The sensor input can be used to identify rooms, room geometry, room materials, objects, object material, and the like, such as described above, and to determine whether (and in what fashion) rooms are acoustically connected. In some examples, acoustic graph structures can be modified manually, such as when a mixed reality designer wishes to add a virtual room (which may have no real-world counterpart) to one or more existing rooms.

Figure 11:
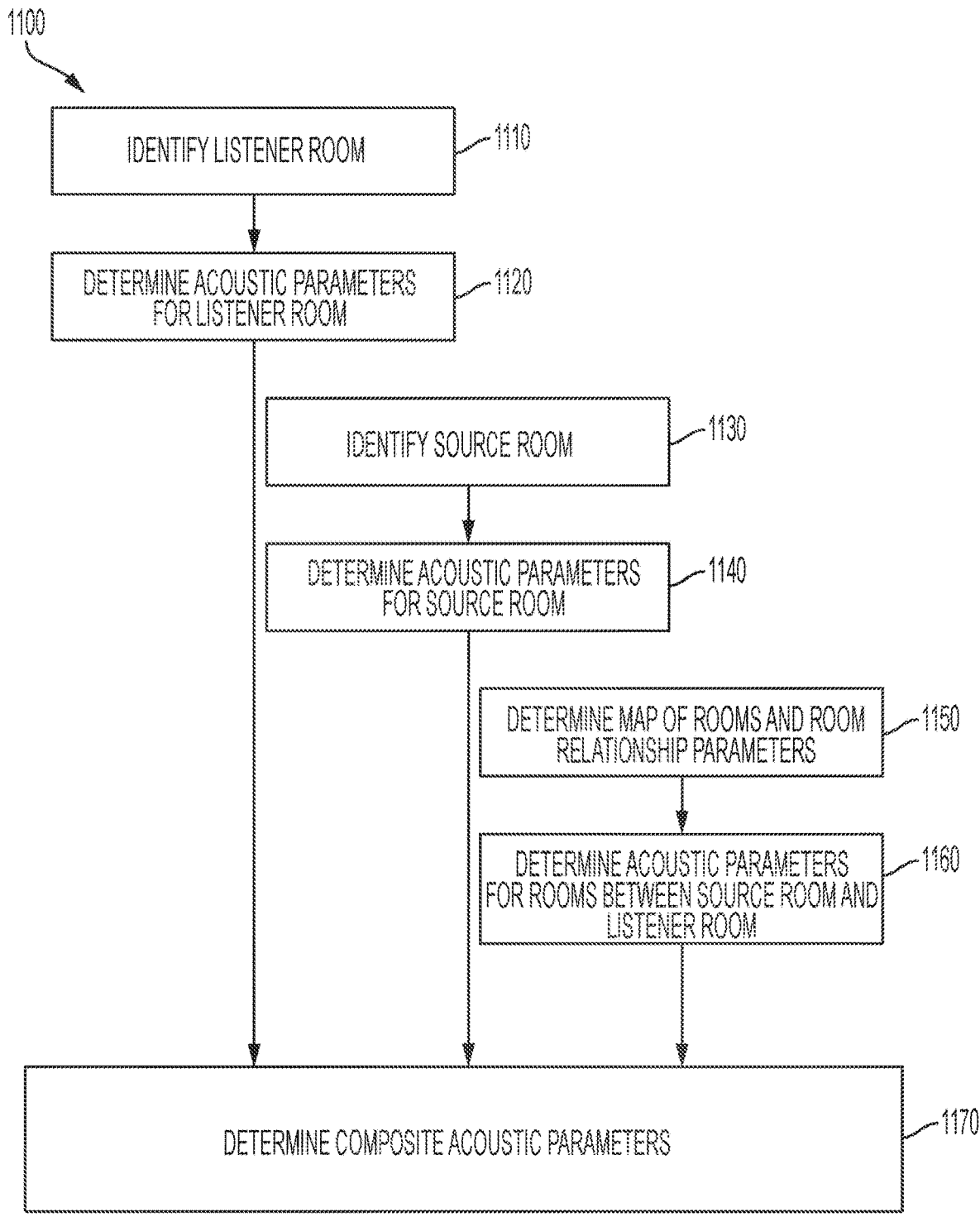
FIG. 11 illustrates a flow chart of an example process for determining composite acoustic parameters of an acoustic environment of a mixed reality system, according to one or more examples of the disclosure.

FIG. 11 shows an example process 1100 of determining a set of composite acoustic parameters associated with two or more acoustically connected rooms, for a sound that is presented (by a sound source) in a first room, and that may be heard (by a user) in a second room, different from the first. Example process 1100 can be used to retrieve acoustic parameters to apply to an audio signal and can be performed at, for example, stage 630 of example process 600 described above. At stage 1110, a room corresponding to the user's location can be identified, such as described above with respect to stage 710 of example process 700. This user's room may correspond to, for example, living room 910 described above. At stage 1120, the acoustic parameters of the user's room are determined, for example as described above with respect to FIGS. 7-8 and stages 720 through 760. In the example described above, these parameters may be described by acoustic parameters 1012.

At stage 1130, a room corresponding to the location of the sound can be identified, such as described above with respect to stage 710 of example process 700. For example, this sound source may correspond to sound source 964 described above; and the sound source's room may correspond to dining room 960 (which is acoustically connected to living room 910) described above. At stage 1140, the acoustic parameters of the sound source's room are determined, for example as described above with respect to FIGS. 7-8 and stages 720 through 760. In the example described above, these parameters may be described by acoustic parameters 1062.

At stage 1150 of example process 1100, an acoustic graph can be determining that describes the acoustic relationship between the user's room and the sound source's room. The acoustic graph can correspond to acoustic graph structure 1000 described above. In some examples, this acoustic graph can be retrieved in a manner analogous to the process described with respect to FIG. 7 for retrieving acoustic parameters; for example, the acoustic graph can be selected, based on sensor input, from a set of acoustic graphs that may be stored on a client device and/or a server.

Upon determining the acoustic graph, it can be determined from the acoustic graph which rooms may be acoustically connected to the source's room and/or the user's room, and what acoustic effect those rooms may have on the sound presented. For instance, using acoustic graph structure 1000 as an example, the acoustic graph indicates that living room 1010 and dining room 1060 are directly connected, by a first path; and the acoustic graph further indicates that the living room 1010 and dining room 1060 are also connected indirectly via a second path including kitchen 1040. At stage 1160, acoustic parameters for such intermediate rooms can be determined (e.g., as described above with respect to FIGS. 7-8 and stages 720 through 760). In addition, stage 1160 can determine parameters describing the acoustic relationship between these rooms (such as the size and shape of objects or passageways between the rooms), such as described above.

The outputs of stages 1120, 1140, and 1160—that is, acoustic parameters corresponding to the user's room, the sound source room, and any intermediate rooms, respectively, along with parameters describing their acoustic connections—can be presented to stage 1170, at which point they can be combined into a single composite set of acoustic parameters that can be applied to the sound, as described, for instance, in J. Jot et al., *Binaural Simulation of Complex Acoustic Scenes for Interactive Audio*, Audio Engineering Society Convention Paper 6950 (Oct. 1, 2006). In some examples, the composite set of parameters can be determined based on the acoustic relationships between the rooms, such as may be represented by the acoustic graph. For instance, in some examples, if the user's room and the sound source's room are separated by a thick wall, the acoustic parameters of the user's room may dominate in the composite set of acoustic parameters, with respect to the acoustic parameters of the sound source's room. However, in some examples, if the rooms are separated by a large doorway, the acoustic parameters of the sound source's room may be more prominent. The composite parameters can also be determined based on the user's location relative to the rooms; for instance, if the user is located close to a neighboring room, the acoustic parameters of that room may be more prominent than if the user were located farther away from the room. Upon determining a composite set of acoustic parameters, the composite set can be applied to the sound to impart the acoustic characteristics of not just a single room, but an entire connected acoustic environment as described by the acoustic graph.

Figure 12:
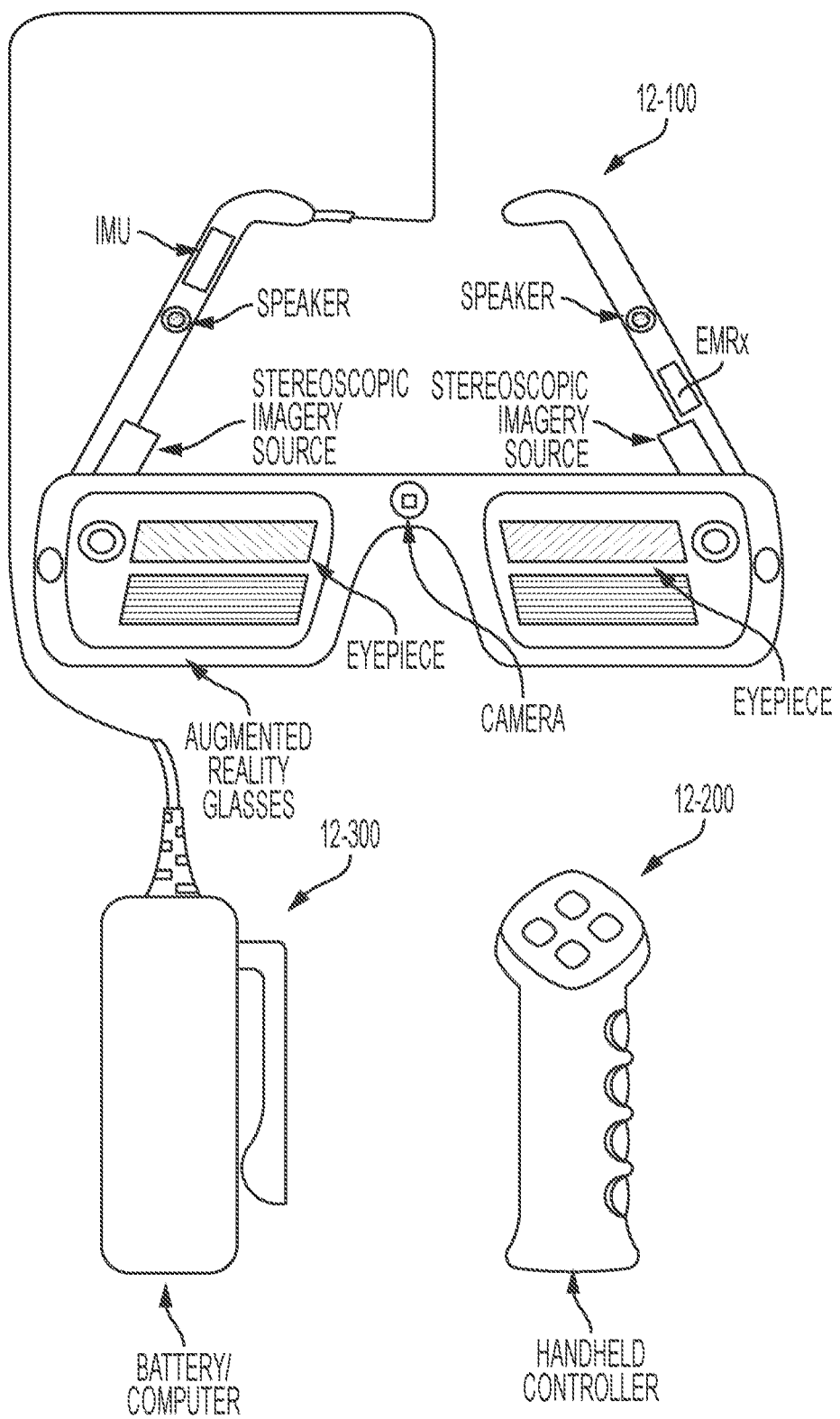
FIGS. 12-14 illustrate components of an example wearable mixed reality system, according to one or more examples of the disclosure.
Figure 13:
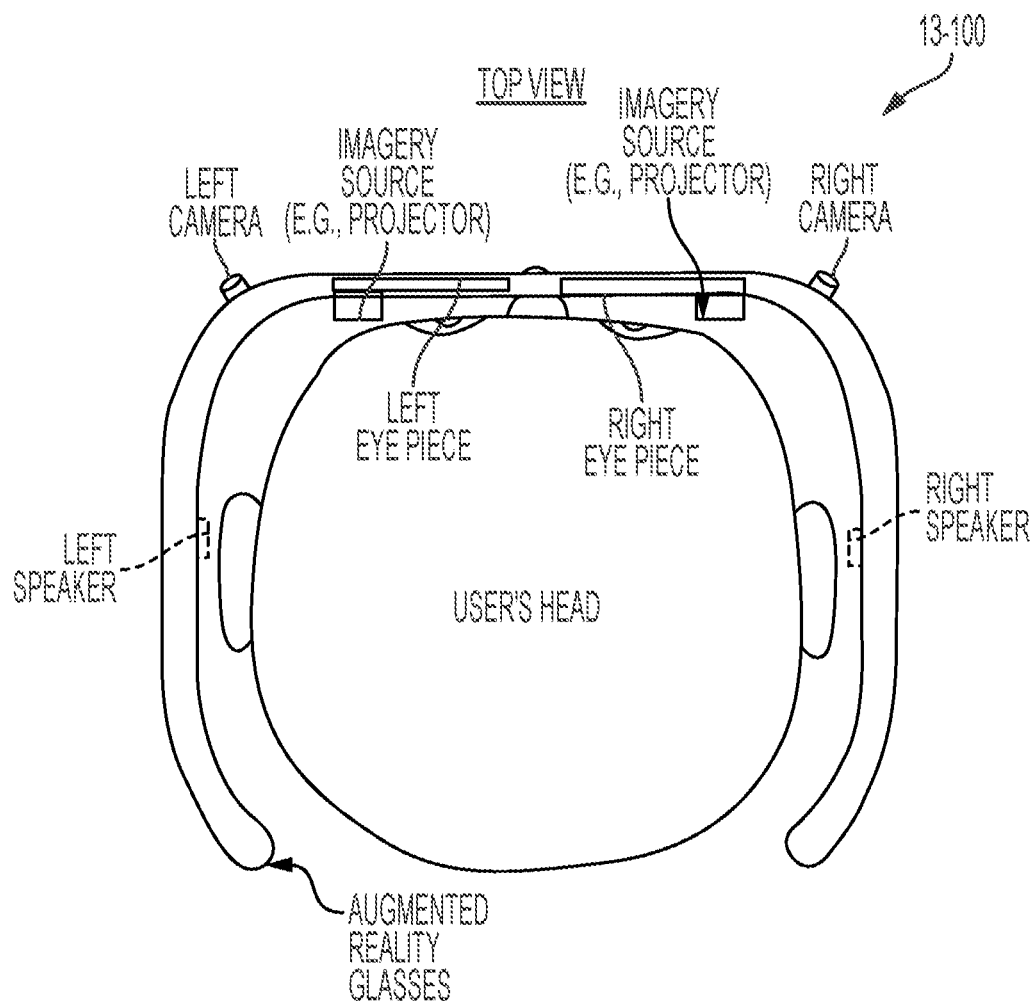
Figure 14:
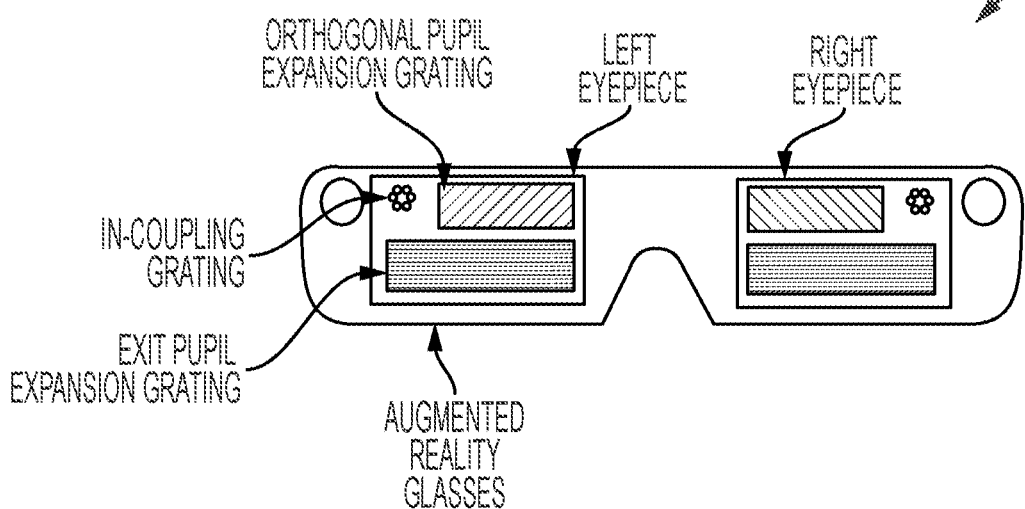

FIGS. 12, 13, and 14 describe components of an example wearable system that may correspond to one or more examples described above. For example, example wearable head unit 12-100 shown in FIG. 12, example wearable head unit 13-100 shown in FIG. 13, and/or example wearable head unit 14-100 shown in FIG. 14 may correspond to wearable head unit 200; example handheld controller 12-200 shown in FIG. 12 may correspond to handheld controller 300; and example auxiliary unit 12-300 shown in FIG. 12 may correspond to auxiliary unit 320. As illustrated in FIG. 12, wearable head unit 12-100 (also referred to as augmented reality glasses) may include eyepieces, camera(s) (e.g., depth camera, RGB camera, and the like), stereoscopic imagery sources, inertial measurement unit (IMU), and speakers. Referring briefly to FIG. 13, wearable head unit 13-100 (also referred to as augmented reality glasses) may include left and right eyepieces, imagery source (e.g., projector), left and right cameras (e.g., depth camera, RGB camera, and the like), and left and right speakers. Wearable head unit 13-100 may be worn on a user's head. Referring briefly to FIG. 14, wearable head unit 14-100 (also referred to as augmented reality glasses) may include left and right eyepieces, each eyepiece including one or more in-coupling gratings, orthogonal pupil expansion grating, and exit pupil expansion grating. Referring back to FIG. 12, wearable head unit 12-100 may be communicatively coupled to auxiliary unit 12-300 (also referred to as battery/computer), for example, by a wired or a wireless connection. Handheld controller 12-200 may be communicatively coupled to wearable head unit 12-100 and/or auxiliary unit 12-300, for example, by a wired or a wireless connection.

Figure 15:
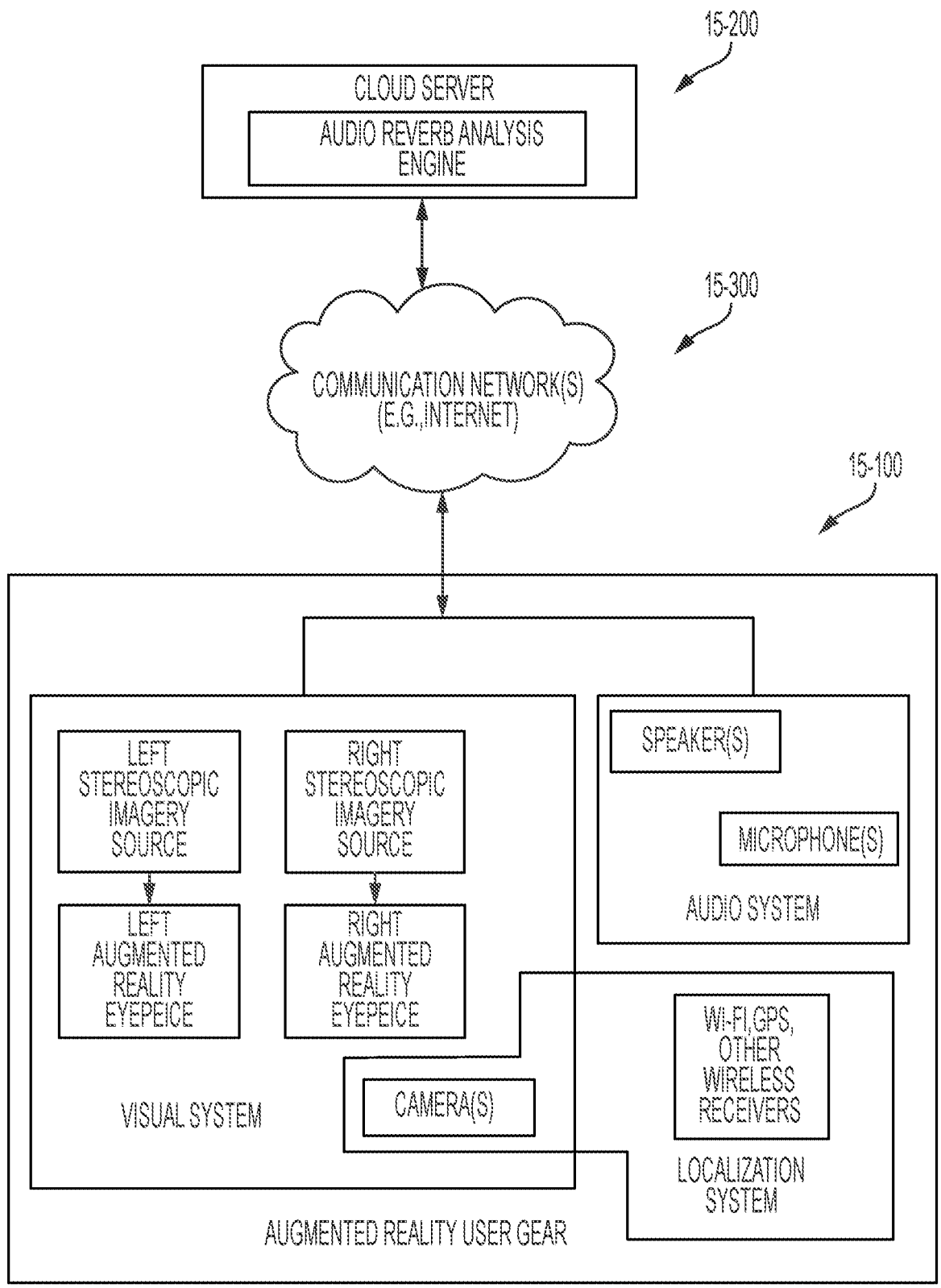
FIG. 15 illustrates an example configuration of components of an example mixed reality system, according to one or more examples of the disclosure.

FIG. 15 describes an example configuration of an example wearable system that may correspond to one or more examples described above. For instance, example augmented reality user gear 15-100 may comprise a wearable head unit and may correspond to client device 510 described above with respect to FIG. 5; cloud server 15-200 may correspond to server device 520 described above with respect to FIG. 5; and communication network 15-300 may correspond to communication network 530 described above with respect to FIG. 5. Cloud server 15-200 may include, among other components/elements/modules, an audio reverb analysis engine. Communication network 15-300 may be, for example, the Internet. Augmented reality user gear 15-100 may include, for example, wearable head unit 200. Augmented reality user gear 15-100 may include a visual system, an audio system, and a localization system. The visual system may include left and right stereoscopic imagery sources that provide imagery to left and right augmented reality eyepieces, respectively. The visual system may further include one or more cameras (e.g., depth camera, RGB camera, and/or the like). The audio system may include one or more speakers and one or more microphones. The localization system may include sensors such as the one or more cameras, and Wi-Fi, GPS, and/or other wireless receivers.

Figure 16:
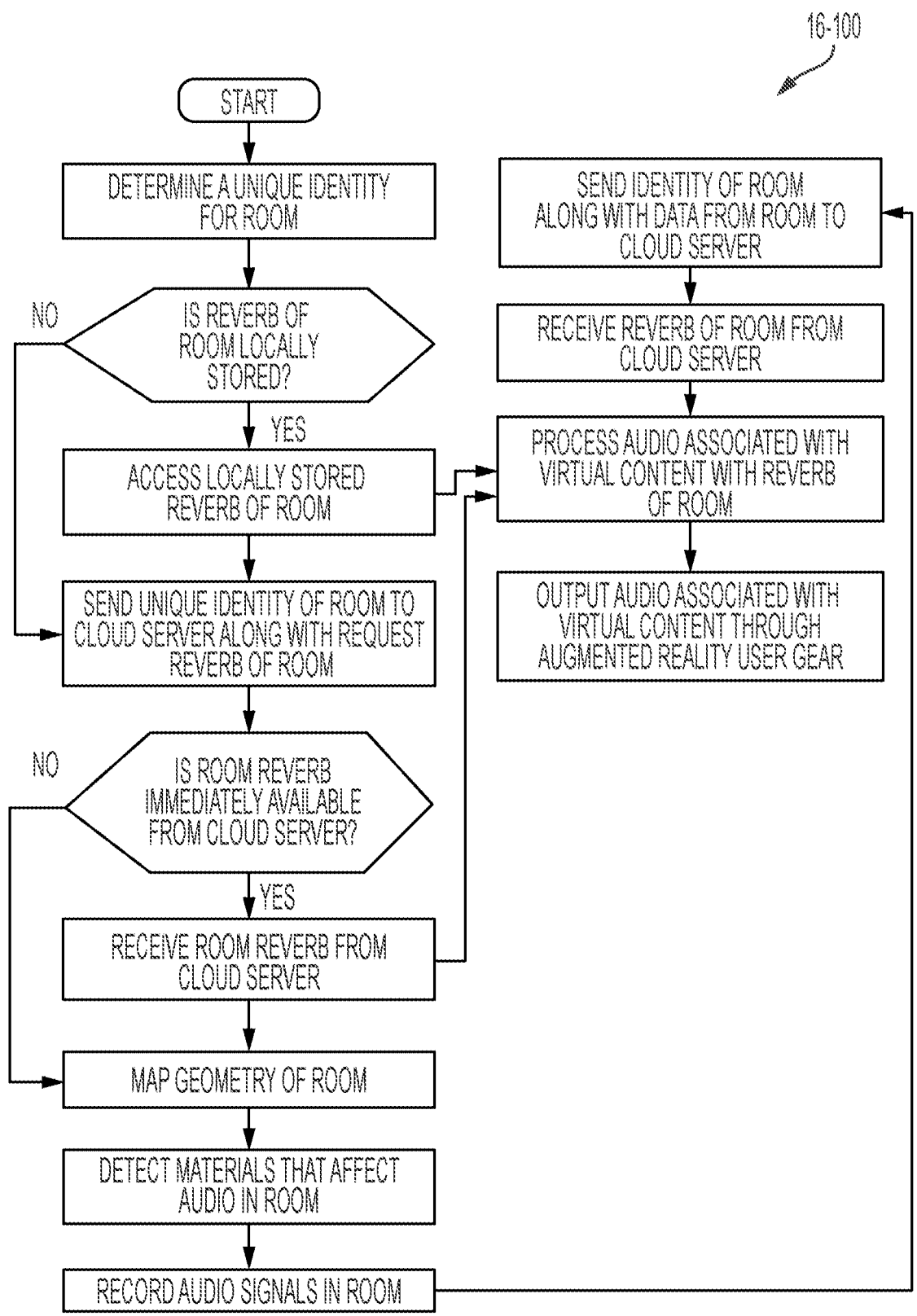

FIG. 16 illustrates a flow chart of an example process 16-100 for presenting audio signals to a user of a mixed reality system, which may correspond to one or more examples described above. For example, one or more aspects of example process 16-100 may correspond to one or more of the example processes described above with respect to FIGS. 6, 7, and/or 8. The mixed reality system to which example process 16-100 refers may include a mixed reality device. After starting the example process, an identity for a room is determined. It is determined whether reverberation characteristics/parameters of the room are stored locally, for example, on the mixed reality device (sometimes referred to as client device). If the reverberation characteristics/parameters of the room are stored locally, the locally stored reverberation characteristics/patterns are accessed and audio associated with virtual content with the reverberation characteristics/parameters of the room are processed. If the reverberation characteristics/parameters of the room are not stored locally, the identity for the room is sent to a cloud server along with a request for reverberation characteristics/parameters of the room. It is determined whether reverberation characteristics/parameters of the room are immediately available from the cloud server. If the reverberation characteristics/parameters of the room are immediately available from the cloud server, the room reverberation characteristics/parameters of the room are received from the cloud server and audio associated with virtual content with the reverberation characteristics/parameters of the room are processed. If the reverberation characteristics/parameters of the room are not immediately available from the cloud server, a geometry of the room is mapped, materials that affect audio in the room are detected, and audio signals in the room are recorded. The identity for the room, mapped geometry of the room, the materials that affect the audio in the room, and the recorded audio signals in the room are sent to the cloud server. The reverberation characteristics/parameters of the room are received from the cloud server and audio associated with virtual content with the reverberation characteristics/parameters of the room are processed. After audio associated with virtual content with the reverberation characteristics/parameters of the room are processed, audio associated with virtual content is output through the mixed reality system (e.g., via mixed/augmented reality user gear).

FIGS. 17-19 illustrate a flow charts of example processes 17-100, 18-100, and 19-100, respectively, for presenting audio signals to a user of a mixed reality system, which may correspond to one or more examples described above. For example, one or more aspects of example processes 17-100, 18-100, and/or 19-100 may correspond to one or more of the example processes described above with respect to FIGS. 6, 7, and/or 8.

In some examples, one or more steps of the process 17-100 of FIG. 17 may be performed by a cloud server. After starting the example process 17-100, an identity of a room along with a request for reverberation characteristics/parameters of the room is received. Reverberation characteristics/parameters of the room are sent to first mixed/augmented reality user gear.

In some examples, one or more steps of the process 18-100 of FIG. 18 may be performed by a cloud server. After starting the example process 18-100, an identity of a particular room is received. A persistent world model graph is checked to identify adjacent connected rooms. Reverberation characteristics/parameters of any adjacent connected rooms are accessed. The reverberation characteristics/parameters of any adjacent connected rooms are transmitted to mixed/augmented reality user gear.

In some examples, one or more steps of the process 19-100 of FIG. 19 may be performed by a cloud server. After starting the example process 19-100, an identity of a room along with room data is received from first mixed/augmented reality user gear. The room data may include, for example, a mapped geometry of the room, materials that affect audio in the room, and recorded audio signals in the room. In some examples, based on the room geometry and the materials that affect audio in the room, reverberation characteristics/parameters are computed. In some examples, the recorded audio signals in the room are processed to extract reverberation characteristics/parameters of the room. The reverberation characteristics/parameters of the room in association with the identity of the room are stored in the cloud server. The reverberation characteristics/parameters of the room are sent to the first mixed/augmented reality user gear.

Figure 20:
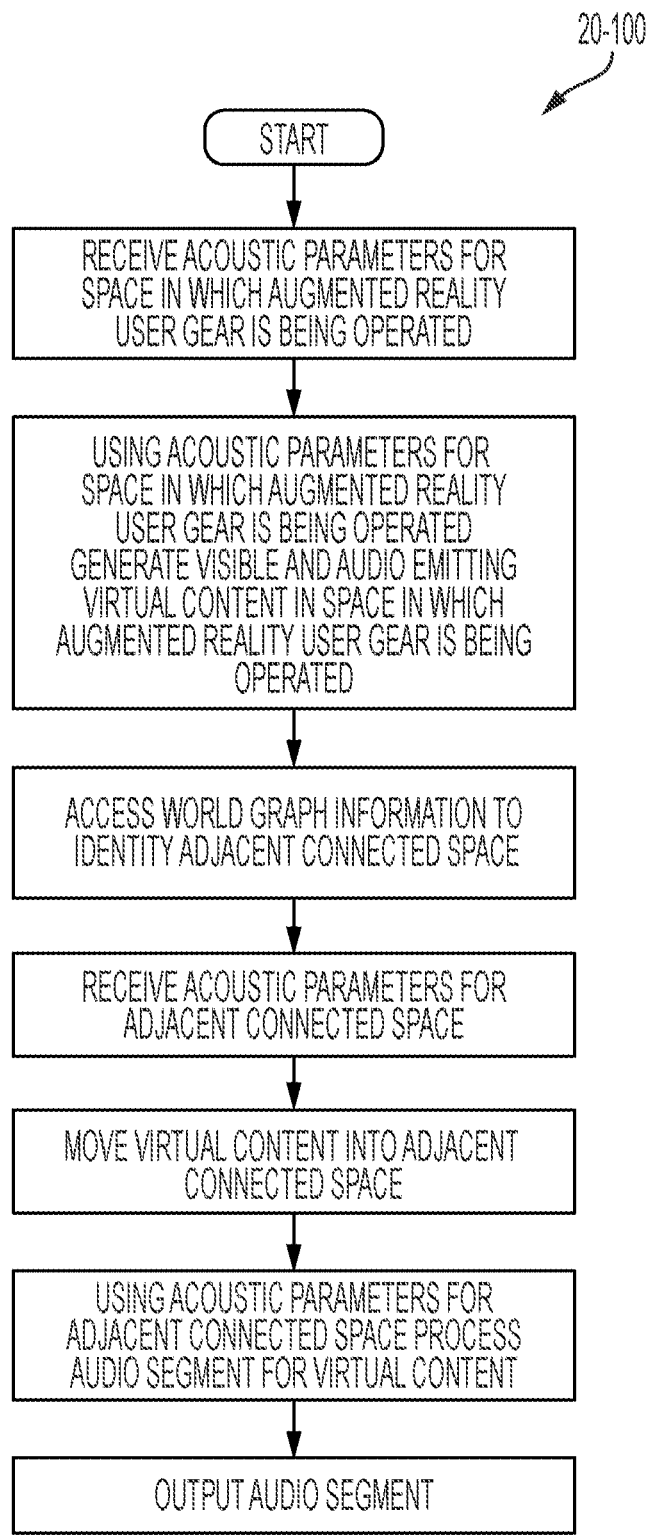

FIG. 20 illustrates a flow chart of an example process 20-100 for presenting an audio signal to a user of a mixed reality system, based on parameters of acoustically connected spaces, which may correspond to one or more examples described above. For example, one or more aspects of example process 20-100 may correspond to the example process described above with respect to FIG. 11. After starting the example process 20-100, acoustic parameters for a space in which mixed/augmented reality user gear is being operated is received. Using acoustic parameters for space in which the mixed/augmented reality user gear is being operated, visible and/or audio emitting virtual content is generated in a space in which the mixed/augmented reality user gear is being operated. World graph information is accessed to identify adjacent connected spaces. Acoustic parameters for the adjacent connected spaces are received. Virtual content is moved into the adjacent connected spaces. Using the acoustic parameters for the adjacent connected spaces, audio segment for the virtual content is processed. The processed audio segment can then be presented as output.

Figure 21:
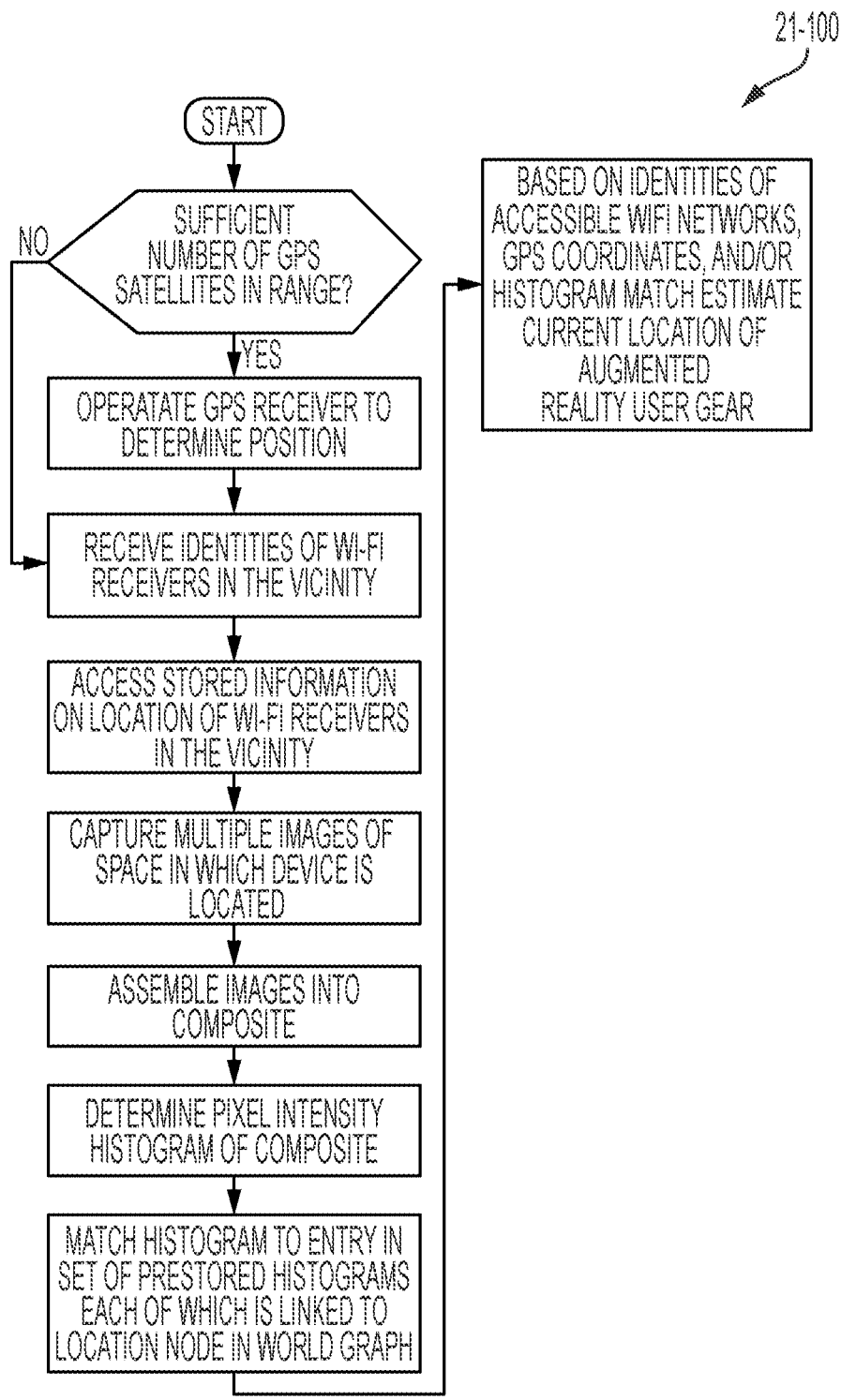
FIG. 21 illustrates a flow chart of an example process for determining a location of a user of a mixed reality system, according to one or more examples of the disclosure.

FIG. 21 illustrates a flow chart of an example process 21-100 for determining a location of a user of a mixed reality system, which may correspond to one or more examples described above. For instance, example process 21-100 could be performed at stage 710 of example process 700, described above with respect to FIG. 7. In the example, after starting, it is determined whether a sufficient number of GPS satellites are in range. If a sufficient number of GPS satellites are in range, a GPS receiver is operated to determine a position. If it is determined a sufficient number of GPS satellites are not in range, identities of Wi-Fi receivers in the vicinity are received. Stored information on localization of Wi-Fi receivers in the vicinity are accessed. One or more images of space in which the device is located are captured. Images are assembled into a composite. A pixel intensity histogram of the composite is determined. The determined histogram is matched to a set of pre-stored histograms, each of which is linked to a location node in a world graph. Based on the identities of the accessible Wi-Fi networks, GPS networks, and/or the histogram match, a current location of the mixed/augmented reality user gear can be estimated.

In some examples, an augmented reality user gear may include a localization subsystem for determining an identity of a space in which the augmented reality user gear is located, a communication subsystem for communicating the identity of the space in which the augmented reality gear is located for receiving at least one audio parameter associated with the identity of the space, and an audio output subsystem for processing an audio segment based on the at least one parameter and outputting the audio segment. Instead of or in addition to the above, in some examples, an augmented reality user gear may include a sensor subsystem for obtaining information bearing on acoustic properties of a first space in which the augmented reality gear is located, an audio processing subsystem for processing an audio segment based on the information bearing on acoustic properties of the first space, wherein the audio processing subsystem is communicatively coupled to the sensor subsystem, and an audio speaker for outputting the audio segment the audio speaker coupled to the audio processing subsystem for receiving the audio segment. Instead of or in addition to the above, in some examples, the sensor subsystem is configured to obtain geometry information for the first space. Instead of or in addition to the above, in some examples, the sensor subsystem includes a camera. Instead of or in addition to the above, in some examples, the camera includes a depth camera. Instead of or in addition to the above, in some examples, the sensor system includes a stereo camera. Instead of or in addition to the above, in some examples, the sensor subsystem includes an object recognizer configured to recognize distinct objects having distinct acoustic absorption properties. Instead of or in addition to the above, in some examples, the object recognizer is configured to recognize at least one object selected from the group consisting of: carpeting, curtains and sofas. Instead of or in addition to the above, in some examples, the sensor subsystem includes a microphone. Instead of or in addition to the above, in some examples, the augmented reality gear further includes a localization subsystem for determining an identity of the first space in which the augmented reality user gear is located, and a communication subsystem for communicating the identity of the first space in which the augmented reality gear is located and for transmitting information bearing on the acoustic properties of the first space in which the augmented reality gear is located. Instead of or in addition to the above, in some examples, the communication subsystem is further configured to receive information derived from the acoustic properties of a second space. Instead of or in addition to the above, in some examples, the augmented reality gear further includes a localization subsystem for determining that a virtual sound source is located in the second space, and an audio processing subsystem for processing an audio segment associated with the virtual sound source, based on the information bearing on acoustic properties of the second space.

Although the disclosed examples have been fully described with reference to the accompanying drawings, it is to be noted that various changes and modifications will become apparent to those skilled in the art. For example, elements of one or more implementations may be combined, deleted, modified, or supplemented to form further implementations. Such changes and modifications are to be understood as being included within the scope of the disclosed examples as defined by the appended claims.

What is claimed is:

1. A method of presenting sound to a user of a mixed reality environment, the method comprising:
    determining a first location with respect to the mixed reality environment;
    determining a first acoustic parameter associated with the first location;
    determining a second location with respect to the mixed reality environment;
    determining an acoustic relationship between the first location and the second location;
    determining, based on the first acoustic parameter and the acoustic relationship, a transfer function;
    detecting an audio event associated with the mixed reality environment, wherein the audio event is associated with a first audio signal;
    applying the transfer function to the first audio signal to produce a second audio signal; and
    presenting, to the user, a sound based on the second audio signal.

2. The method of claim 1, wherein:
    the method further comprises, at a first time, communicating the first acoustic parameter to a memory; and
    determining the transfer function comprises receiving the first acoustic parameter from the memory at a second time later than the first time.

3. The method of claim 1, wherein determining the acoustic relationship between the first location and the second location comprises determining that the first location is acoustically coupled to the second location.

4. The method of claim 1, wherein determining the acoustic relationship between the first location and the second location comprises determining that the first location belongs to a first acoustic region and the second location belongs to the first acoustic region.

5. The method of claim 1, wherein determining the first acoustic parameter comprises detecting a spatial property of the first location via a sensor of a wearable device associated with the mixed reality environment.

6. The method of claim 1, wherein determining the second location comprises determining the second location based on an output of a sensor of a wearable device associated with the mixed reality environment.

7. The method of claim 1, wherein the first location is a source location of the audio event and the second location is a location of the user.

8. The method of claim 1, further comprising determining a second acoustic parameter associated with the second location, wherein the transfer function is determined based further on the second acoustic parameter.

9. The method of claim 1, further comprising storing the first acoustic parameter and the first location in a graph, the graph describing a relationship between two or more locations in the mixed reality environment.

10. A wearable system comprising:
    one or more sensors;
    one or more speakers; and
    one or more processors configured to perform a method of presenting sound to a user of a mixed reality environment, the method comprising:
        determining a first location with respect to the mixed reality environment;
        determining a first acoustic parameter associated with the first location;
        determining, via the one or more sensors, a second location with respect to the mixed reality environment;
        determining an acoustic relationship between the first location and the second location;
        determining, based on the first acoustic parameter and the acoustic relationship, a transfer function;
        detecting an audio event associated with the mixed reality environment, wherein the audio event is associated with a first audio signal;
        applying the transfer function to the first audio signal to produce a second audio signal; and
        presenting, to the user, via the one or more speakers, a sound based on the second audio signal.

11. The wearable system of claim 10, wherein:
    the method further comprises, at a first time, communicating the first acoustic parameter to a memory; and
    determining the transfer function comprises receiving the first acoustic parameter from the memory at a second time later than the first time.

12. The wearable system of claim 10, wherein determining the acoustic relationship between the first location and the second location comprises determining that the first location is acoustically coupled to the second location.

13. The wearable system of claim 10, wherein determining the acoustic relationship between the first location and the second location comprises determining that the first location belongs to a first acoustic region and the second location belongs to the first acoustic region.

14. The wearable system of claim 10, wherein determining the first acoustic parameter comprises detecting a spatial property of the first location via the one or more sensors.

15. The wearable system of claim 10, wherein the first location is a source location of the audio event and the second location is a location of the user.

16. A non-transitory computer-readable medium storing instructions which, when executed by one or more processors, cause the one or more processors to perform a method of presenting sound to a user of a mixed reality environment, the method comprising:
   determining a first location with respect to the mixed reality environment;
   determining a first acoustic parameter associated with the first location;
   determining a second location with respect to the mixed reality environment;
   determining an acoustic relationship between the first location and the second location;
   determining, based on the first acoustic parameter and the acoustic relationship, a transfer function;
   detecting an audio event associated with the mixed reality environment, wherein the audio event is associated with a first audio signal;
   applying the transfer function to the first audio signal to produce a second audio signal; and
   presenting, to the user, a sound based on the second audio signal.

17. The non-transitory computer-readable medium of claim 16, wherein determining the acoustic relationship between the first location and the second location comprises determining that the first location belongs to a first acoustic region and the second location belongs to the first acoustic region.

18. The non-transitory computer-readable medium of claim 16, wherein determining the first acoustic parameter comprises detecting a spatial property of the first location via a sensor of a wearable device associated with the mixed reality environment.

19. The non-transitory computer-readable medium of claim 16, wherein determining the second location comprises determining the second location based on an output of a sensor of a wearable device associated with the mixed reality environment.

20. The non-transitory computer-readable medium of claim 16, wherein the first location is a source location of the audio event and the second location is a location of the user.

* * * * *